(12) United States Patent
Kasahara et al.

(10) Patent No.: US 12,448,930 B2
(45) Date of Patent: Oct. 21, 2025

(54) INDIVIDUAL THROTTLE-TYPE OR UNEQUAL INTERVAL COMBUSTION-TYPE MULTI-CYLINDER ENGINE UNIT

(71) Applicant: YAMAHA HATSUDOKI KABUSHIKI KAISHA, Iwata (JP)

(72) Inventors: Tatsuya Kasahara, Shizuoka (JP); Yuta Shimizu, Shizuoka (JP); Tatsuya Aoyama, Shizuoka (JP); Atsushi Hirano, Shizuoka (JP); Kazuteru Iwamoto, Shizuoka (JP); Atsuya Hidai, Shizuoka (JP); Hisatoshi Kinoshita, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 19/033,462

(22) Filed: Jan. 21, 2025

(65) Prior Publication Data
US 2025/0163863 A1     May 22, 2025

Related U.S. Application Data

(63) Continuation-in-part of application No. PCT/JP2023/026809, filed on Jul. 21, 2023.

(30) Foreign Application Priority Data

Jul. 21, 2022  (JP) ................ 2022-116208

(51) Int. Cl.
F02D 41/14     (2006.01)

(52) U.S. Cl.
CPC ..... *F02D 41/1443* (2013.01); *F02D 41/1441* (2013.01); *F02D 41/1454* (2013.01); *F02D 41/1495* (2013.01)

(58) Field of Classification Search
CPC .................. F02D 41/1441; F02D 41/1454
See application file for complete search history.

(56) References Cited

FOREIGN PATENT DOCUMENTS

| BR | 112017020218 B1 | * | 2/2023 | ............ F01N 13/18 |
|---|---|---|---|---|
| EP | 3643908 A1 | * | 4/2020 | ............ F02D 41/34 |
| JP | H03-134236 A | | 6/1991 | |
| JP | H03-202626 A | | 9/1991 | |
| JP | H04-112949 A | | 4/1992 | |

(Continued)

*Primary Examiner* — Ngoc T Nguyen
(74) *Attorney, Agent, or Firm* — Rabin & Berdo, P.C.

(57) ABSTRACT

An engine unit, including: a plurality of cylinders respectively cooperating with a plurality of pistons; a plurality of individual exhaust pipes configured to allow exhaust gases from the plurality of cylinders to respectively flow therethrough; an exhaust manifold, including a merge portion into which the individual exhaust pipes merge, and a catalyst disposed downstream thereof; a group of pre-catalyst oxygen sensors disposed between the cylinders and the catalyst for all paths of the exhaust gases flowing into the catalyst from the plurality of cylinders; a post-catalyst oxygen sensor disposed in the exhaust manifold, downstream of the catalyst in the flow direction of the exhaust gas; and a control device configured to detect a cylinder-to-cylinder imbalance in air-fuel ratio between the plurality of cylinders, and a deterioration of the catalyst, using detection results of pre-catalyst and post-catalyst oxygen sensors without using an air-fuel ratio sensor.

8 Claims, 10 Drawing Sheets

(56) References Cited

FOREIGN PATENT DOCUMENTS

| JP | H06-200809 A | 7/1994 |
|---|---|---|
| JP | 4400402 B2 | 1/2010 |
| JP | 4415840 B2 | 2/2010 |

\* cited by examiner (A)

(B)

INDIVIDUAL THROTTLE-TYPE OR UNEQUAL INTERVAL COMBUSTION-TYPE MULTI-CYLINDER ENGINE UNIT

CROSS-REFERENCE TO RELATED APPLICATIONS

This application is a continuation-in-part application of International Application No. PCT/JP2023/26809, filed on Jul. 21, 2023, which is based upon and claims the benefit of priority to Japanese Patent Application No. 2022-116208, filed on Jul. 21, 2022. The entire contents of the applications are incorporated herein by reference.

TECHNICAL FIELD

The present teaching relates to an individual throttle-type or unequal interval combustion-type multi-cylinder engine unit.

BACKGROUND ART

An individual throttle-type multi-cylinder engine is known as a type of an internal combustion engine. The individual throttle-type multi-cylinder engine includes a plurality of cylinders in which intake passages that are individual and separate from each other are respectively provided. A throttle valve is disposed in each of the intake passages. As the throttle valve in each intake passage is opened or closed, a fuel-air mixed gas flows into the corresponding cylinder. Such an individual throttle-type multi-cylinder engine is disclosed in Patent Literature 1 (PTL 1), for example.

An unequal interval combustion-type multi-cylinder engine is also known as a type of internal combustion engine. In the unequal interval combustion-type multi-cylinder engine, cylinders undergo a fuel combustion in a predetermined order. In the unequal interval combustion-type multi-cylinder engine, a combustion interval, which is an interval from a combustion in one cylinder to a combustion in the next cylinder is not constant.

Such an unequal interval combustion-type multi-cylinder engine is disclosed in Patent Literature 2 (PTL 2), for example.

CITATION LIST

Patent Literature

PTL 1: Japanese Patent No. 4400402
PTL 2: Japanese Patent No. 4415840

SUMMARY OF INVENTION

Technical Problem

The present teaching aims to achieve both detection of a catalyst deterioration and detection of a cylinder-to-cylinder imbalance in air-fuel ratio without using an air-fuel ratio sensor, in a multi-cylinder engine unit, which is on a premise that the amount of air to be supplied to cylinders can vary from cylinder to cylinder.

Solution to the Problem (1) An individual throttle-type or unequal interval combustion-type multi-cylinder engine unit according to an embodiment of the present teaching includes: a plurality of cylinders each cooperating with a piston to define a combustion chamber; a plurality of individual exhaust pipes corresponding to the plurality of cylinders, respectively, each of the plurality of individual exhaust pipes being configured to let an exhaust gas coming from the corresponding cylinder flow through the individual exhaust pipe; an exhaust manifold including a merge portion and a catalyst, the merge portion being where the plurality of individual exhaust pipes merge together, the catalyst being disposed downstream of the merge portion in a flow direction of the exhaust gas; a pre-catalyst oxygen sensor group for detecting a percentage of oxygen in the exhaust gas, the pre-catalyst oxygen sensor group being disposed at a location in a path of the exhaust gas, the location being between the plurality of cylinders and the catalyst, such that the pre-catalyst oxygen sensor group exists on paths of all the exhaust gases flowing into the catalyst respectively from the plurality of cylinders; a post-catalyst oxygen sensor for detecting a percentage of oxygen in the exhaust gas having passed through the catalyst, the post-catalyst oxygen sensor being disposed at a location in the exhaust manifold, the location being downstream of the catalyst in a flow direction of the exhaust gas; and a control device. The pre-catalyst oxygen sensor group includes at least one individual oxygen sensor that each is provided any of the individual exhaust pipes, the number of the at least one individual oxygen sensor being the same as, or one less than the total number of the individual exhaust pipes. The control device is configured to detect a cylinder-to-cylinder imbalance in air-fuel ratio between the plurality of cylinders by using a detection result obtained by the pre-catalyst oxygen sensor group, and to detect a deterioration of the catalyst by using a detection result obtained by the whole or a part of the pre-catalyst oxygen sensor group and a detection result obtained by the post-catalyst oxygen sensor, whereby the control device detects both the cylinder-to-cylinder imbalance in air-fuel ratio between the plurality of cylinders and the deterioration of the catalyst not by using an air-fuel ratio sensor but instead by using the pre-catalyst oxygen sensor group and the post-catalyst oxygen sensor.

More specifically, the control device detects a cylinder-to-cylinder imbalance in air-fuel ratio between the plurality of cylinders while individually executing a feedback control on the amount of fuel to be supplied to each of the plurality of cylinders, by using a detection result obtained by the pre-catalyst oxygen sensor group, for example.

The foregoing individual throttle-type or unequal interval combustion-type multi-cylinder engine unit includes the pre-catalyst oxygen sensor group, which is disposed at a location in the path of the exhaust gas, the location being upstream of the catalyst. The pre-catalyst oxygen sensor group is disposed on the path of the exhaust gas coming from each of the plurality of cylinders, and therefore is capable of detecting a percentage of oxygen in the exhaust gas coming from each of the cylinders. By using a detection result obtained by this pre-catalyst oxygen sensor group, the control device is able to detect whether the air-fuel ratio of a mixed gas to be supplied to each of the plurality of cylinders is rich or lean. The individual throttle-type or unequal interval combustion-type multi-cylinder engine unit includes not only the pre-catalyst oxygen sensor group but also the post-catalyst oxygen sensor, which is disposed downstream of the catalyst. By using a detection result obtained by the pre-catalyst oxygen sensor group and a detection result obtained by the post-catalyst oxygen sensor, the control device is able to grasp a percentage of oxygen upstream of the catalyst and a percentage of oxygen downstream of the catalyst, and thus is able to detect a deterioration of the catalyst. This configuration makes it possible to achieve both detection of a catalyst deterioration and detection of a cylinder-to-cylinder imbalance in air-fuel ratio without using an air-fuel ratio sensor, even in the individual throttle-type or unequal interval combustion-type multi-cylinder engine unit, which is on a premise that the amount of air to be supplied to the plurality of cylinders can vary from cylinder to cylinder.

(2) Preferably, the foregoing multi-cylinder engine unit according to (1) satisfies any of (A) to (C) below.

(A) The pre-catalyst oxygen sensor group includes a plurality of individual oxygen sensors provided to the plurality of individual exhaust pipes, respectively, the plurality of individual oxygen sensors each being configured to detect a percentage of oxygen in the exhaust gas in the corresponding individual exhaust pipe. The control device is configured to detect a cylinder-to-cylinder imbalance in air-fuel ratio between the plurality of cylinders by using detection results obtained by each of the plurality of individual oxygen sensors, and to detect a deterioration of the catalyst by using a percentage of oxygen in the exhaust gas upstream of the catalyst detected by the plurality of individual oxygen sensors and a percentage of oxygen in the exhaust gas downstream of the catalyst detected by the post-catalyst oxygen sensor.

(B) The pre-catalyst oxygen sensor group includes at least one individual oxygen sensor and a pre-catalyst oxygen sensor, the at least one individual oxygen sensor being provided to any of the individual exhaust pipes, the number of the at least one individual oxygen sensor being the same as, or one less than the total number of the individual exhaust pipes, the at least one individual oxygen sensor being configured to detect a percentage of oxygen in the exhaust gas in the corresponding individual exhaust pipe, the pre-catalyst oxygen sensor being disposed at a location in the exhaust manifold, the location being upstream of the catalyst in a flow direction of the exhaust gas, the pre-catalyst oxygen sensor being configured to detect a percentage of oxygen in the exhaust gas flowing into the catalyst. The control device is configured to detect a cylinder-to-cylinder imbalance in air-fuel ratio between the plurality of cylinders by using detection results obtained by the at least one individual oxygen sensor and the pre-catalyst oxygen sensor, and to detect a deterioration of the catalyst by using a percentage of oxygen in the exhaust gas upstream of the catalyst detected by the pre-catalyst oxygen sensor and a percentage of oxygen in the exhaust gas downstream of the catalyst detected by the post-catalyst oxygen sensor.

(C) The pre-catalyst oxygen sensor group includes a plurality of individual oxygen sensors and a pre-catalyst oxygen sensor, the plurality of individual oxygen sensors being provided to the plurality of individual exhaust pipes, respectively, the plurality of individual oxygen sensors each being configured to detect a percentage of oxygen in the exhaust gas in the corresponding individual exhaust pipe, the pre-catalyst oxygen sensor being disposed at a location in the exhaust manifold, the location being upstream of the catalyst in a flow direction of the exhaust gas, the pre-catalyst oxygen sensor being configured to detect a percentage of oxygen in the exhaust gas flowing into the catalyst. The control device is configured to detect a cylinder-to-cylinder imbalance in air-fuel ratio between the plurality of cylinders by using a detection result obtained by the pre-catalyst oxygen sensor group, and to detect a deterioration of the catalyst by using both a percentage of oxygen in the exhaust gas upstream of the catalyst detected by the whole or a part of the plurality of individual oxygen sensors and the pre-catalyst oxygen sensor and a percentage of oxygen in the exhaust gas downstream of the catalyst detected by the post-catalyst oxygen sensor.

In the individual throttle-type or unequal interval combustion-type multi-cylinder engine unit that satisfies (A) above, all the individual exhaust pipes are provided with the individual oxygen sensors. By using detection results obtained by each of the individual oxygen sensors, the control device is able to detect whether the air-fuel ratio of a mixed gas to be supplied to each of the plurality of cylinders is rich or lean. The plurality of individual oxygen sensors each detect a percentage of oxygen in the exhaust gas flowing into the catalyst. By using detection results obtained by the plurality of individual oxygen sensors and a detection result obtained by the post-catalyst oxygen sensor, the control device is able to grasp a percentage of oxygen upstream of the catalyst and a percentage of oxygen downstream of the catalyst, and thus is able to detect a deterioration of the catalyst. This configuration makes it possible to achieve both detection of a deterioration of the catalyst and detection of a cylinder-to-cylinder imbalance in air-fuel ratio without using an air-fuel ratio sensor and also without using a sensor disposed in a portion of the exhaust manifold, the portion being upstream of the catalyst, even in the individual throttle-type or unequal interval combustion-type multi-cylinder engine unit, which is on a premise that the amount of air to be supplied to the plurality of cylinders can vary from cylinder to cylinder.

In the individual throttle-type or unequal interval combustion-type multi-cylinder engine unit that satisfies (B) above, one of the individual exhaust pipes is provided with no individual oxygen sensor. Instead, the pre-catalyst oxygen sensor is disposed in a portion of the exhaust manifold, the portion being upstream of the catalyst. The pre-catalyst oxygen sensor, for example, detects a percentage of oxygen in the exhaust gas coming from the individual exhaust pipe provided with no individual oxygen sensor. Accordingly, by using a detection result obtained by the pre-catalyst oxygen sensor and a detection result obtained by the individual oxygen sensor, the control device is able to detect whether the air-fuel ratio of a mixed gas to be supplied to each of the plurality of cylinders is rich or lean. In addition, by using a detection result obtained by the pre-catalyst oxygen sensor and a detection result obtained by the post-catalyst oxygen sensor, the control device is able to grasp a percentage of oxygen upstream of the catalyst and a percentage of oxygen downstream of the catalyst, and thus is able to detect a deterioration of the catalyst. This configuration makes it possible to achieve both detection of a catalyst deterioration and detection of a cylinder-to-cylinder imbalance in air-fuel ratio without using an air-fuel ratio sensor and also without providing the individual oxygen sensor to every individual exhaust pipe, even in the individual throttle-type or unequal interval combustion-type multi-cylinder engine unit, which is on a premise that the amount of air to be supplied to the plurality of cylinders can vary.

In the individual throttle-type or unequal interval combustion-type multi-cylinder engine unit that satisfies (C) above, all the individual exhaust pipes are provided with the individual oxygen sensors, and in addition, the pre-catalyst oxygen sensor is also provided. The control device, for example, like in the case of (A) above, may detect a cylinder-to-cylinder imbalance in air-fuel ratio by using detection results obtained by the plurality of individual oxygen sensors, without using a detection result obtained by the pre-catalyst oxygen sensor. The control device, for example, like in the case of (B) above, may detect a cylinder-to-cylinder imbalance in air-fuel ratio by using a detection result obtained by a part of the individual oxygen sensors and a detection result obtained by the pre-catalyst oxygen sensor. The control device, for example, like in the case of (A) above, may detect a deterioration of the catalyst by using detection results obtained by the plurality of individual oxygen sensors and a detection result obtained by the post-catalyst oxygen sensor. The control device, for example, like in the case of (B) above, may detect a deterioration of the catalyst by using a detection result obtained by the pre-catalyst oxygen sensor and a detection result obtained by the post-catalyst oxygen sensor. This configuration makes it possible to achieve both detection of a catalyst deterioration and detection of a cylinder-to-cylinder imbalance in air-fuel ratio in multiple ways without using an air-fuel ratio sensor, even in the individual throttle-type or unequal interval combustion-type multi-cylinder engine unit, which is on a premise that the amount of air to be supplied to the plurality of cylinders can vary from cylinder to cylinder.

(3) The foregoing multi-cylinder engine unit according to (1) or (2) may further include a plurality of injectors provided corresponding to the plurality of cylinders, respectively, the plurality of injectors each being configured to supply fuel to the corresponding cylinders based on an injector signal that is received from the control device. In at least a part of a catalyst deterioration diagnosis period for detecting a deterioration of the catalyst, the control device performs the following control: while the air-fuel ratio in each of the plurality of cylinders is changing in a diagnosis-purpose air-fuel ratio pattern in which richness and leanness repeatedly alternate as a result of the control device transmitting the injector signal of a diagnosis-purpose fuel supply pattern to the plurality of cylinders so as to make the air-fuel ratio in the merge portion repeatedly alternate between richness and leanness; if a difference that influences the air-fuel ratio in the merge portion, which is repeatedly alternating between richness and leanness, arises between the air-fuel ratio in at least one of the plurality of cylinders and the diagnosis-purpose air-fuel ratio pattern, the control device makes a modification to the diagnosis-purpose fuel supply pattern corresponding to at least one of the plurality of cylinders in order to continue the repeated alternation between richness and leanness of the air-fuel ratio in the merge portion.

In the multi-cylinder engine unit according to (3) above, the control device is, in the catalyst deterioration diagnosis, able to adjust a timing of inverting the air-fuel ratio in each of the plurality of cylinders from richness to leanness or from leanness to richness. Accordingly, even if detection of the air-fuel ratio in a certain cylinder is delayed as compared to the other cylinders, an influence that the delay has on the catalyst deterioration diagnosis can be reduced. This configuration makes it possible to detect a catalyst deterioration with an improved accuracy, as well as to achieve both detection of a catalyst deterioration and detection of a cylinder-to-cylinder imbalance in air-fuel ratio.

(4) In the multi-cylinder engine unit according to (3), the control device may execute a preparation control for making the air-fuel ratio in the merge portion rich or lean, and then execute a fuel increase/decrease control for transmitting the injector signal to the plurality of cylinders so as to make the air-fuel ratio in the merge portion repeatedly alternate between richness and leanness. The control device, in the fuel increase/decrease control, may perform the following control: while the air-fuel ratio in each of the plurality of cylinders is changing in a diagnosis-purpose air-fuel ratio pattern in which richness and leanness repeatedly alternate; if a difference that influences the air-fuel ratio in the merge portion, which is repeatedly alternating between richness and leanness, arises between the air-fuel ratio in at least one of the plurality of cylinders and the diagnosis-purpose air-fuel ratio pattern, the control device makes a modification to the diagnosis-purpose fuel supply pattern corresponding to at least one of the plurality of cylinders in order to continue the repeated alternation between richness and leanness of the air-fuel ratio in the merge portion.

In the foregoing multi-cylinder engine unit according to (4), the control device executes the preparation control for controlling and making the air-fuel ratio in the merge portion rich or lean, before executing the fuel increase/decrease control in the catalyst deterioration diagnosis. Accordingly, at the beginning of the fuel increase/decrease control, the air-fuel ratio in the merge portion is able to be controlled appropriately. This configuration makes it possible to detect a catalyst deterioration with an improved accuracy, as well as to achieve both detection of a catalyst deterioration and detection of a cylinder-to-cylinder imbalance in air-fuel ratio.

The "multi-cylinder engine unit" is a generic term for an engine and an intake and exhaust system, for example. The multi-cylinder engine unit includes an engine that generates power to be used for traveling of a vehicle equipped with the multi-cylinder engine unit, for example. The engine is an internal combustion engine. The engine is not an electric motor. The engine is a reciprocating engine, for example. The engine is a four-stroke engine, for example. The engine is a gasoline engine in which a fuel combustion is caused by an ignition plug, for example. The engine may be a diesel engine in which a fuel combustion is caused by compressed air. The engine is a multi-cylinder engine of in-line type, V-type, or horizontally opposed type, for example. The engine includes a plurality of cylinders, pistons, and a crankshaft, for example. While the multi-cylinder engine unit is mounted on a vehicle, the engine is disposed between a front wheel and a rear wheel in the front-rear direction of the vehicle, for example. The engine is disposed so as not to overlap the front wheel and the rear wheel in a side view, for example. The multi-cylinder engine unit may be a hybrid engine unit including an engine and an electric motor. The hybrid engine unit may be a parallel hybrid engine unit or may be a series hybrid engine unit, for example.

The individual throttle-type or unequal interval combustion-type multi-cylinder engine unit is mounted on a leaning vehicle, for example. The leaning vehicle is transport equipment. The leaning vehicle is a vehicle driven by human. The leaning vehicle includes a vehicle body configured to lean to the left when the leaning vehicle turns to the left, and lean to the right when the leaning vehicle turns to the right, for example. The leaning vehicle is a motorcycle, for example. The leaning vehicle is not limited to the motorcycle, and may be a motor tricycle or a four-wheeled motor vehicle, for example. The leaning vehicle includes at least one front wheel and at least one rear wheel, for example. The leaning vehicle is not particularly limited, and examples thereof include leaning vehicles of a scooter type, a moped type, an off-road type, and an on-road type.

The individual throttle-type or unequal interval combustion-type multi-cylinder engine unit is mounted on a straddled vehicle, for example. The straddled vehicle is one of the kinds of the leaning vehicles. The straddled vehicle is a vehicle of a type having a saddle on which a driver sits astride. In the straddled vehicle, a sitting driver has his/her left leg positioned to the left of the center of the straddled vehicle in the left-right direction, and his/her right leg positioned to the right of the center of the straddled vehicle in the left-right direction. The motorcycle and motor tricycle mentioned above are examples of the straddled vehicle. An all-terrain vehicle (ATV) can also be mentioned as an example of the straddled vehicle. The ATV is an example of a four-wheeled straddled motor vehicle. It may be acceptable that the straddled vehicle has no wheel, for example. Examples of such a straddled vehicle include a snowmobile. The snowmobile has a trackbelt instead of a wheel, for example.

The "individual throttle-type multi-cylinder engine unit" includes a plurality of intake passages through which air to be supplied to a plurality of cylinders passes, for example. The individual throttle-type multi-cylinder engine unit includes a number of intake passages, the number being equal to the number of a plurality of cylinders, for example. The plurality of intake passages are individual and separate from each other, for example. The plurality of intake passages are each connected to the corresponding cylinder. Here, the plurality of intake passages may be unified as one in an intake port through which outside air is taken in.

The individual throttle-type multi-cylinder engine unit includes throttle valves provided to the plurality of intake passages, respectively, for example. The plurality of throttle valves each adjust the amount of air that is to flow into the corresponding cylinder, for example. The plurality of throttle valves are controlled simultaneously, for example. The plurality of throttle valves may be controlled individually. The degrees of opening of the plurality of throttle valves are controlled to be the same nominal value, for example. The degrees of opening of the plurality of throttle valves may be controlled to be different nominal values.

The individual throttle-type multi-cylinder engine unit includes injectors for injecting fuel, the injectors being provided to the plurality of intake passages, respectively, for example. The plurality of injectors are each disposed downstream of the throttle valve in an intake flow direction, for example. The plurality of injectors are each controlled electronically, for example. The plurality of injectors inject the fuel into the intake passages, respectively, for example. Each of the plurality of injectors does not inject the fuel directly into the cylinder, for example. The individual throttle-type multi-cylinder engine unit is just required to include two or more cylinders, and the number of cylinders is not limited.

The "unequal interval combustion-type multi-cylinder engine unit" refers to an engine unit configured such that at least one of a plurality of combustion intervals is different from the other combustion intervals, the plurality of combustion intervals being represented by crank angles in a rotation cycle of a crankshaft. The combustion interval represented by crank angle means a rotation angle of the crankshaft from when one cylinder has a combustion as a reference (crank angle is 0 degrees) to when another cylinder that is supposed to undergo the next combustion has a combustion. Here, an unequal interval combustion-type four-stroke two-cylinder engine unit will be taken as an example. In this engine unit, given that a combustion in first cylinder is used as a reference, a combustion in second cylinder occurs when a crankshaft is rotated by 270 degrees from the combustion in the first cylinder. When the crankshaft is rotated by 450 degrees from the combustion in the second cylinder, a combustion in the first cylinder occurs again. In this case, the unequal interval combustion-type two-cylinder engine unit has combustion intervals of 270 degrees and 450 degrees in crank angle. The unequal interval combustion-type two-cylinder engine unit may have combustion intervals of 180 degrees and 540 degrees in crank angle. In another example, an unequal interval combustion-type three-cylinder engine unit has combustion intervals of 180 degrees, 270 degrees, and 270 degrees in crank angle. An unequal interval combustion-type four-cylinder engine unit has combustion intervals of 270 degrees, 180 degrees, 90 degrees, and 180 degrees in crank angle, for example. The unequal interval combustion-type multi-cylinder engine unit is just required to include two or more cylinders, and the number of cylinders is not limited.

It is just required that the multi-cylinder engine unit be of an individual throttle type or of an unequal interval combustion type. That is, the multi-cylinder engine unit may be a multi-cylinder engine unit of both the individual throttle type and the unequal interval combustion type. The multi-cylinder engine unit may be a multi-cylinder engine unit of both the individual throttle type and an equal interval combustion type. The multi-cylinder engine unit may be a multi-cylinder engine unit of both a non-individual throttle type and the unequal interval combustion type. The multi-cylinder engine unit may be a multi-cylinder engine unit of both the non-individual throttle type and the equal interval combustion type. The multi-cylinder engine unit of the non-individual throttle type includes one throttle valve that adjusts the amount of air to flow into two or more cylinders, for example. The multi-cylinder engine unit of the non-individual throttle type includes a number of throttle valves, the number being less than the number of cylinders.

The "a plurality of individual exhaust pipes" are each connected to a corresponding one cylinder. The plurality of individual exhaust pipes are connected to exhaust ports, respectively, and the exhaust ports are provided in the plurality of cylinders, respectively, for example. Each of the plurality of individual exhaust pipes substantially lets only an exhaust gas coming from a corresponding one cylinder flow therethrough, for example. Each of the plurality of individual exhaust pipes does substantially not let an exhaust gas coming from any non-corresponding cylinder flow therethrough. Each of the plurality of individual exhaust pipes substantially does not let exhaust gases coming respectively from two or more cylinders flow therethrough. At the upstream ends of the respective individual exhaust pipes (portions of the respective individual exhaust pipes connected to the exhaust ports of the engine), the individual exhaust pipes are individual and separate from each other, for example. The plurality of individual exhaust pipes are individual and separate from each other until they reach the merge portion, for example. Here, it may be acceptable that any of the plurality of individual exhaust pipes joins with some of the plurality of individual exhaust pipes before reaching the merge portion. In other words, a joining portion may be interposed between the individual exhaust pipes and the merge portion. Also in such a configuration, it is required that each oxygen sensor be installed such that the oxygen sensor is able to detect the percentage of oxygen in a corresponding individual exhaust pipe. As long as this requirement is satisfied, it is acceptable that the oxygen sensor is installed at the joining portion. The plurality of individual exhaust pipes are coupled to the exhaust manifold. Each of the plurality of individual exhaust pipes is a part of the path of the exhaust gas, the part extending from a corresponding cylinder to the merge portion of the exhaust manifold, for example. Each of the plurality of individual exhaust pipes includes a straight section, which extends in a straight line, for example. Each of the plurality of individual exhaust pipes includes a curved section, which extends in a curved line, for example.

At least one of the plurality of individual exhaust pipes is at least partially disposed farther in forward direction than a front surface of the engine, for example. At least one of the plurality of individual exhaust pipes is at least partially disposed farther in the forward direction than the rotation axis of the crankshaft, for example. While the multi-cylinder engine unit is mounted on a vehicle, at least one of the plurality of individual exhaust pipes is at least partially disposed between the engine and a front wheel in a side view, for example. While the multi-cylinder engine unit is mounted on a vehicle, at least one of the plurality of individual exhaust pipes is disposed so as to at least partially overlap a front wheel or a rear wheel in a front view, for example. The full length of each of the plurality of individual exhaust pipes is not less than ⅓ of the full length of the exhaust manifold, for example. Preferably, the full length of each of the plurality of individual exhaust pipes is not less than ¼ of the full length of the exhaust manifold, for example. The full length of each of the plurality of individual exhaust pipes is shorter than the full length of the exhaust manifold, for example. Here, the full length of the individual exhaust pipe and the full length of the exhaust manifold are lengths along the central axis of each exhaust pipe, for example. The merge portion is at least partially disposed farther in the forward direction than the rotation axis of the crankshaft, for example.

The most upstream oxygen sensor of the pre-catalyst oxygen sensor group in the flow direction of the exhaust gas is disposed farther in the forward direction than the front surface of the engine, for example. The most upstream oxygen sensor of the pre-catalyst oxygen sensor group in the flow direction of the exhaust gas is disposed farther in the rearward direction than the rear end of a front wheel, for example. The post-catalyst oxygen sensor is disposed farther in the forward direction and/or farther in the downward direction than a cylinder axis line of the engine in a side view, for example. The cylinder axis line coincides with the central axis of the cylinder, for example. The post-catalyst oxygen sensor is disposed farther in the rearward direction and/or farther in the downward direction than a line that passes through the rotation axis of the crankshaft and also that is perpendicular to the cylinder axis line in a side view, for example.

The exhaust gas is produced by a combustion of a mixed gas that contains the fuel and intake air, which is taken in from the outside of a vehicle equipped with the individual throttle-type or unequal interval combustion-type multi-cylinder engine unit, for example. The exhaust gas may be produced by a combustion of a mixed gas that contains the intake air, the exhaust gas, and the fuel. In other words, the individual throttle-type or unequal interval combustion-type multi-cylinder engine unit may adopt an exhaust gas recirculation system (EGR system) in which at least a part of the exhaust gas is taken in.

The "exhaust manifold" is an exhaust pipe into which all of the plurality of individual exhaust pipes are combined, for example. The exhaust manifold is disposed downstream of the plurality of individual exhaust pipes in the flow direction of the exhaust gas. The exhaust manifold refers to an exhaust pipe extending from the downstream ends of the plurality of individual exhaust pipes to an exhaust opening, for example. The exhaust manifold includes a catalyst, for example. The exhaust manifold includes a silencer, for example.

The "merge portion" is a section at which the plurality of individual exhaust pipes merge together, for example. The merge portion lets the exhaust gases coming respectively from the plurality of cylinders flow therethrough, for example. The merge portion is a section extending from the downstream ends of the plurality of individual exhaust pipes to the catalyst, for example. The merge portion includes a branch section and a straight section, the branch section being where the plurality of individual exhaust pipes merge together, the straight section extending in a straight line from the branch section toward the downstream in the flow direction of the exhaust gas, for example.

The "catalyst" is disposed in a part of the exhaust manifold, the part being downstream of the merge portion, for example. The catalyst is disposed in the exhaust manifold, for example. The catalyst cleans the exhaust gas flowing in the exhaust manifold. The catalyst has an oxygen storage capacity, for example. The catalyst is a three-way catalyst, for example. The catalyst may be an oxidation catalyst, an NOx selective reduction catalyst, an NOx storage reduction catalyst, or the like. The catalyst may not always have to be an oxidation-reduction catalyst. The catalyst may be an oxidation catalyst or a reduction catalyst that cleans the exhaust gas through oxidation or reduction only. The catalyst oxidizes or reduces a hydrocarbon, CO, and NOx in the exhaust gas, for example. The catalyst may oxidize or reduce any one or two of a hydrocarbon, CO, and NOx. The catalyst oxidizes a hydrocarbon into water and $CO_2$, for example. The catalyst oxidizes CO into $CO_2$, for example. The catalyst reduces NOx into nitrogen and oxygen, for example. The catalyst includes a base material and a precious metal disposed on a surface of the base material, the precious metal having an exhaust gas cleaning effect, for example. The precious metal is platinum, palladium, rhodium, or the like, for example.

The "pre-catalyst oxygen sensor group" is a generic term for an oxygen sensor disposed upstream of a catalyst in a flow direction of an exhaust gas. Thus, objects that can be encompassed by the pre-catalyst oxygen sensor group are the individual oxygen sensor and the pre-catalyst oxygen sensor. The pre-catalyst oxygen sensor group may include only the individual oxygen sensor, or may include both the individual oxygen sensor and the pre-catalyst oxygen sensor. The "pre-catalyst oxygen sensor group being disposed at a location in a path of the exhaust gas, the location being between the plurality of cylinders and the catalyst, such that the pre-catalyst oxygen sensor group exists on paths of all the exhaust gases flowing into the catalyst respectively from the plurality of cylinders" means the following. The plurality of cylinders undergo a combustion of the mixed gas one after another with a predetermined time difference (crank angle) therebetween. The exhaust gases discharged respectively from the plurality of cylinders flow into the exhaust manifold one after another. The pre-catalyst oxygen sensor group is disposed so as to be capable of detecting the percentages of oxygen in all the exhaust gases that are flowing respectively from the plurality of cylinders into the exhaust manifold at different timings. That is, at least either one of the individual oxygen sensor or the pre-catalyst oxygen sensor is disposed on each of the paths of the exhaust gases extending from the plurality of cylinders to the catalyst.

The "individual oxygen sensors" are provided to all of the plurality of individual exhaust pipes, for example. It may be acceptable that only one individual exhaust pipe out of the plurality of individual exhaust pipes is provided with no individual oxygen sensor, and the other individual exhaust pipes are all provided with the individual oxygen sensors. The number of individual oxygen sensors is equal to the number of individual exhaust pipes, or is one less than the number of individual exhaust pipes. Thus, the number of individual exhaust pipes provided with the individual oxygen sensors is at least (N−1), where (N) represents the total number of individual exhaust pipes. Provided that the total number of individual exhaust pipes is (N), the individual oxygen sensors are provided to (N−1) individual exhaust pipes, or provided to all of the individual exhaust pipes, for example. The individual oxygen sensor is disposed in the straight section of the individual exhaust pipe, for example. The individual oxygen sensor detects the percentage of oxygen in the exhaust gas flowing through the individual exhaust pipe, for example. That is, the individual oxygen sensor detects the percentage of oxygen in the exhaust gas that is discharged from a corresponding one cylinder, for example.

The "pre-catalyst oxygen sensor" is disposed in the exhaust manifold, for example. The number of pre-catalyst oxygen sensors may be one, or may be two or more, for example. The pre-catalyst oxygen sensor is disposed in the merge portion of the exhaust manifold, for example. The pre-catalyst oxygen sensor is disposed in the straight section of the merge portion, for example. The pre-catalyst oxygen sensor detects the percentage of oxygen in the exhaust gas before the exhaust gas is cleaned by the catalyst, for example. The pre-catalyst oxygen sensor detects the percentages of oxygen in the exhaust gases inflowing from the respective cylinders one after another, for example. That is, the pre-catalyst oxygen sensor detects the percentages of oxygen in the exhaust gases that are discharged from all of the plurality of cylinders, for example.

The "post-catalyst oxygen sensor" is disposed in the exhaust manifold, for example. The number of post-catalyst oxygen sensors may be one, or may be two or more, for example. The post-catalyst oxygen sensor is disposed at a location in the exhaust manifold, the location being between the catalyst and the exhaust opening, for example.

Each of the individual oxygen sensor, the pre-catalyst oxygen sensor, and the post-catalyst oxygen sensor (hereinafter, collectively referred to simply as oxygen sensor) detects the percentage of oxygen in the exhaust gas. The percentage of oxygen is a binary index of the oxygen concentration in the exhaust gas, for example. In other words, the oxygen sensor detects just whether the percentage of oxygen in the exhaust gas is high or low, for example. The oxygen sensor detects that the percentage of oxygen in the exhaust gas is high, if the percentage of oxygen in the exhaust gas exceeds a predetermined threshold, for example. The oxygen sensor detects that the percentage of oxygen in the exhaust gas is low, if the percentage of oxygen in the exhaust gas is not more than a predetermined threshold, for example. The threshold used for the detection that the percentage of oxygen is high and the threshold used for the detection that the percentage of oxygen is low may be set individually. Based on the percentage of oxygen detected by this oxygen sensor, the air-fuel ratio of the mixed gas to be supplied to each cylinder is determined. A state in which the fuel is too much for a desired air-fuel ratio is expressed as the air-fuel ratio being rich. A state in which air is too much for the desired air-fuel ratio is expressed as the air-fuel ratio being lean. The desired air-fuel ratio may be a value or range including a theoretical air-fuel ratio, or may be a value or range slightly deviated from the theoretical air-fuel ratio.

The oxygen sensor has a sensor element part including a solid electrolyte body composed mainly of zirconium oxide, for example. When the sensor element part is heated to a high temperature and brought into an activated state, for example, the oxygen sensor detects the percentage of oxygen in the exhaust gas. The oxygen sensor is not an air-fuel ratio sensor that continuously or linearly detects a change in oxygen concentration in the exhaust gas, for example.

The oxygen sensor is electrically connected to the control device, for example. The oxygen sensor transmits the detected percentage of oxygen, as a detection result, to the control device, for example. More specifically, the oxygen sensor transmits an electrical signal indicating the detected percentage of oxygen to the control device, for example.

The "control device" is an electronic control unit (ECU), for example. The control device includes a processor such as a central processing unit (CPU), a digital signal processor (DSP), etc., for example. The control device may include a nonvolatile memory on which recorded are one or more programs including a part or the whole of arithmetic processing executed by the control device, for example. The processor reads out and executes the one or more programs recorded on the nonvolatile memory, to enable the control device to perform at least the detection of the cylinder-to-cylinder imbalance in air-fuel ratio and the detection of the catalyst deterioration, for example.

The control device, by using the detection result corresponding to each cylinder received from the pre-catalyst oxygen sensor group, individually executes the feedback control on the fuel to be supplied to each of the plurality of cylinders such that the air-fuel ratio of the fuel-air mixed gas to be supplied to each of the plurality of cylinders becomes the desired air-fuel ratio, for example. In more detail, the control device, by using the detection result received from the pre-catalyst oxygen sensor group, determines the air-fuel ratio in each of the plurality of cylinders, for example. The control device executes the feedback control for correcting the amount of fuel to be supplied to each of the plurality of cylinders so as to resolve the determination result, for example. To be specific, the control device increases the amount of fuel supply, upon determining that each of the plurality of cylinders has leanness, and decreases the amount of fuel supply, upon determining that each of the plurality of cylinders has richness. Here, it may not always be required that the resolution of the determination result by the control device be achieved in only one feedback control. The control device controls the amount of fuel to be supplied to each of the plurality of cylinders such that the repeated alternation between richness and leanness relative to the desired air-fuel ratio can be achieved on the whole on a predetermined period basis, for example. That is, the control device controls the amount of fuel to be supplied to each of the plurality of cylinders such that the air-fuel ratio in each of the plurality of cylinders maintains the desired air-fuel ratio or maintains substantially the desired air-fuel ratio, for example.

As mentioned above, the individual throttle-type or unequal interval combustion-type multi-cylinder engine unit is on a premise that the amount of air to be supplied to the cylinders can vary from cylinder to cylinder. Even though the amount of air to be supplied to the cylinders can vary, the control device individually controls the fuel to be supplied to each cylinder, so that the air-fuel ratio in each cylinder falls within a predetermined range from the desired air-fuel ratio, for example. Here, suppose a case in which the air-fuel ratio in a certain cylinder is far in excess of a tolerance range from the desired air-fuel ratio due to some factor. In this case, the air-fuel ratio largely varies between a plurality of cylinders, which makes components in the exhaust gas different from the expected ones, so that a cleaning function of the catalyst is influenced. In such a case, it is desired that a driver or the like of the vehicle equipped with the individual throttle-type or unequal interval combustion-type multi-cylinder engine unit be notified that the air-fuel ratio is largely deviated from the desired air-fuel ratio.

In this respect, for example, if the N-th determination result for at least one of the plurality of cylinders is the same as the (N−1)th determination result, the control device calculates an accumulative correction amount, which has a value greater than the value of the correction amount that was used in the (N−1)th feedback control. The "accumulative correction amount having a greater value" as used herein means that the N-th fuel correction amount is increased as compared to the (N−1)th fuel correction amount if the (N−1)th fuel correction amount is for increase, and the N-th fuel correction amount is decreased as compared to the (N−1)th fuel correction amount if the (N−1)th fuel correction amount is for decrease. The control device increases the accumulative correction amount for each feedback control until the N-th determination result becomes different from the (N−1)th determination result. The control device compares the calculated accumulative correction amount against a predetermined threshold, for example. If the accumulative correction amount is not more than the threshold, the control device executes a feedback control in which the accumulative correction amount is used to correct the amount of fuel to be supplied to an object cylinder, for example. If the accumulative correction amount is more than the threshold, the control device determines that an abnormality of the air-fuel ratio is occurring in the cylinder, for example. Such detection by the control device of an abnormality of the air-fuel ratio in at least one of the plurality of cylinders is referred to as detection of a cylinder-to-cylinder imbalance in air-fuel ratio. The abnormality as used herein refers to a phenomenon in which the fuel correction amount in the feedback control exceeds a predetermined threshold. Upon detecting that a cylinder-to-cylinder imbalance in air-fuel ratio occurs in at least one cylinder, the control device executes a process for notifying a driver or the like that the multi-cylinder engine unit needs to be inspected, for example. The methods for the feedback control and for the detection of the cylinder-to-cylinder imbalance described above are just examples, and not limiting.

The control device detects a deterioration of the catalyst in addition to the cylinder-to-cylinder imbalance in air-fuel ratio. The control device executes an active catalyst deterioration diagnosis in which the percentage of oxygen in the exhaust gas flowing into the catalyst (the percentage of oxygen in the merge portion) is forcibly changed to be rich or lean relative to the desired air-fuel ratio, for diagnosing a deterioration of the catalyst, for example. The active catalyst deterioration diagnosis is a diagnosis method using the oxygen storage capacity of the catalyst. The active catalyst deterioration diagnosis will be detailed below.

The control device determines whether or not an execution condition for the catalyst deterioration diagnosis is satisfied, for example. The execution condition for the catalyst deterioration diagnosis is, for example, the temperature of the catalyst, the speed of a vehicle equipped with the individual throttle-type or unequal interval combustion-type multi-cylinder engine unit, or the like. Upon determining that the execution condition for the catalyst deterioration diagnosis is satisfied, the control device sets a catalyst deterioration diagnosis period, for example. The control device diagnoses a deterioration of the catalyst in the catalyst deterioration diagnosis period, for example. The catalyst deterioration diagnosis period is, though not particularly limited, about 20 seconds, for example.

The control device executes the preparation control in the catalyst deterioration diagnosis period, for example. In the preparation control, the control device controls the fuel to be supplied to the plurality of cylinders such that the air-fuel ratio in the merge portion becomes rich or lean, for example. The control device controls the fuel to be supplied to each of the plurality of cylinders so as to make the air-fuel ratios in all the plurality of cylinders uniformly rich or lean, for example. At this time, the air-fuel ratios in the plurality of cylinders, which are rich or lean, may sometimes be detected at different timings, for example. The control device controls the fuels to be supplied to the plurality of cylinders so as to maintain the air-fuel ratio in the cylinder that became rich or lean first, for example. Here, maintaining the air-fuel ratio in a certain cylinder means that if the air-fuel ratio in a cylinder is rich, the richness is kept, and if it is lean, the leanness is kept, for example. The control device may adjust the amount of fuel to be supplied to a cylinder or the air-fuel ratio in the cylinder as long as the adjustment is within such a range that the air-fuel ratio in the cylinder can be maintained, for example.

The control device executes the fuel increase/decrease control in the catalyst deterioration diagnosis period, for example. The fuel increase/decrease control is executed in order to change the air-fuel ratio in the merge portion from being rich to being lean, or from being lean to being rich, for example. The control device controls the air-fuel ratio in the merge portion, by making the air-fuel ratio of the mixed gas to be supplied to each of the plurality of cylinders change between richness and leanness relative to the desired air-fuel ratio, for example. The fuel increase/decrease control is executed repeatedly in the catalyst deterioration diagnosis period, for example.

The control device may execute the fuel increase/decrease control multiple times, based on a detection result on the air-fuel ratio in one cylinder (reference cylinder) out of the plurality of cylinders, for example. Alternatively, the control device may reset the reference cylinder in each execution of the fuel increase/decrease control, for example. The control device may reset the reference cylinder at least once while the fuel increase/decrease control is being executed multiple times, for example. The control device may control the fuels to be supplied to the plurality of cylinders such that the air-fuel ratio in a cylinder that became rich or lean first is maintained, the control being made at least once in the fuel increase/decrease control, for example. Whether the air-fuel ratio in each cylinder is rich or lean can be determined based on the exhaust gas before flowing into the catalyst. Accordingly, the control device executes the fuel increase/decrease control by using a detection result obtained by the pre-catalyst oxygen sensor group, for example.

The control device, in the fuel increase/decrease control, controls the fuels to be supplied to the plurality of cylinders such that after the air-fuel ratios in all the plurality of cylinders become uniformly rich or lean, the air-fuel ratios in all the plurality of cylinders, which are currently rich or lean, are inverted, for example. The control device may invert the air-fuel ratios of the cylinders at the same time as when the air-fuel ratios in all the plurality of cylinders become uniform in the fuel increase/decrease control, or may invert the air-fuel ratios in the respective cylinders with a predetermined period therebetween, for example. The predetermined period is set as appropriate in consideration of a delay in a response from the pre-catalyst oxygen sensor group, or the like, for example. In sum, it is just required that the control device be able to invert the air-fuel ratios in all the plurality of cylinders, which are currently rich or lean, so as to allow the air-fuel ratio in the merge portion, at which the plurality of individual exhaust pipes merge together, to be controlled to be rich or lean in the fuel increase/decrease control, for example. The control device controls the fuel to be supplied to each of the plurality of cylinders such that the air-fuel ratios in all the plurality of cylinders simultaneously change from being rich to being lean, or from being lean to being rich, for example. It is just required that the control device be able to control the fuels to be supplied to the plurality of cylinders so as to allow the air-fuel ratio in the merge portion to repeatedly alternate between richness and leanness in a certain period, for example.

The control device, in the fuel increase/decrease control, may invert the air-fuel ratios in the respective cylinders, which are rich or lean, at different timings, as long as the air-fuel ratio in the merge portion where the plurality of individual exhaust pipes merge together can be controlled to be rich or lean, for example. The control device may invert the air-fuel ratio in at least one of the plurality of cylinders at a delayed timing, for example. The control device inverts the air-fuel ratio in each cylinder so as not to disrupt a change pattern (diagnosis-purpose air-fuel ratio pattern) of the air-fuel ratio that repeatedly alternates between richness and leanness in the merge portion, for example. If the diagnosis-purpose air-fuel ratio pattern is disrupted in the merge portion, the control device makes a modification to a change pattern (diagnosis-purpose fuel supply pattern) of the fuel to be supplied to at least one of the plurality of cylinders, for example. A phenomenon in which a difference that disrupts the diagnosis-purpose air-fuel ratio pattern, that is, a difference that influences the air-fuel ratio in the merge portion, arises between the air-fuel ratio in at least one of the plurality of cylinders and the diagnosis-purpose air-fuel ratio pattern means that the air-fuel ratio in the merge portion is not able to repeatedly alternate between richness and leanness. A difference that influences the air-fuel ratio in the merge portion arises when, for example, a timing at which the air-fuel ratio in at least one of the plurality of cylinders is inverted and a timing at which the air-fuel ratio in the diagnosis-purpose air-fuel ratio pattern corresponding to this cylinder is inverted are different by not less than a predetermined time length. If a difference that influences the air-fuel ratio in the merge portion arises between the air-fuel ratio in a certain cylinder and the diagnosis-purpose air-fuel ratio pattern corresponding to this cylinder, the control device delays a timing at which the air-fuel ratio in this cylinder is inverted, for example. The control device delays the inversion timing such that the air-fuel ratio in the merge portion repeats richness and leanness, for example. If a difference that influences the air-fuel ratio in the merge portion does not arise between the air-fuel ratio in a certain cylinder and the diagnosis-purpose air-fuel ratio pattern corresponding to this cylinder, the control device either may or may not change the change pattern of the fuel to be supplied to this cylinder. The diagnosis-purpose fuel supply pattern and the diagnosis-purpose air-fuel ratio pattern may be preset, or may be set before execution of the fuel increase/decrease control.

The control device, in the catalyst deterioration diagnosis period, transmits the injector signal so as to maintain the air-fuel ratio in the cylinder that became rich or lean first, based on a detection result obtained by the pre-catalyst oxygen sensor group, for example. Further details are as follows.

In the multi-cylinder engine unit that satisfies (A) above, the control device transmits the injector signal based on detection results obtained by the plurality of individual oxygen sensors, for example.

In the multi-cylinder engine unit that satisfies (B) above, the control device transmits the injector signal based on detection results obtained by at least one individual oxygen sensor and the pre-catalyst oxygen sensor, for example.

In the multi-cylinder engine unit that satisfies (C) above, the control device transmits the injector signal based on detection results obtained by the plurality of individual oxygen sensors, or based on detection results of at least one individual oxygen sensor and the pre-catalyst oxygen sensor, for example.

The control device transmits the injector signal including a rich command for making the air-fuel ratio in an object cylinder rich, for example. The control device transmits the injector signal including a lean command for making the air-fuel ratio in an object cylinder lean, for example. The control device, in at least a part of the catalyst deterioration diagnosis period, transmits the injector signal so as to invert the air-fuel ratio in an object cylinder, for example. More specifically, the control device inverts the air-fuel ratio in an object cylinder by changing the rich command into the lean command, or the lean command into the rich command, for example. Inverting the air-fuel ratio means that the air-fuel ratio that is currently rich is made lean, and the air-fuel ratio that is currently lean is made rich, in an object cylinder, for example.

The control device calculates a catalyst deterioration determination value by using the percentages of oxygen detected by the pre-catalyst oxygen sensor group and the post-catalyst oxygen sensor, for example. The catalyst deterioration determination value is an oxygen storage amount or an oxygen desorption amount of the catalyst calculated by using the percentages of oxygen detected by the pre-catalyst oxygen sensor group and the post-catalyst oxygen sensor, for example. The control device determines whether or not the catalyst is deteriorated, based on the catalyst deterioration determination value thus calculated, for example. In more detail, the control device determines whether or not the catalyst is deteriorated, by comparing the calculated catalyst deterioration determination value against a predetermined threshold, for example.

The control device, in a partial period of the catalyst deterioration diagnosis period, diagnoses a deterioration of the catalyst, for example. It may be acceptable that the control device diagnoses a deterioration of the catalyst throughout the entire period of the catalyst deterioration diagnosis period. In short, the control device diagnoses a deterioration of the catalyst in at least a partial period of the catalyst deterioration diagnosis period. The control device diagnoses a deterioration of the catalyst by using a detection result obtained by at least one oxygen sensor of the pre-catalyst oxygen sensor group and a detection result obtained by the post-catalyst oxygen sensor, for example. While the individual throttle-type or unequal interval combustion-type multi-cylinder engine unit is operating, the control device may execute the catalyst deterioration diagnosis once, or may execute the catalyst deterioration diagnosis multiple times. The control device may diagnose a deterioration of the catalyst by using detection results that the pre-catalyst oxygen sensor group and the post-catalyst oxygen sensor have obtained in one catalyst deterioration diagnosis period, or may diagnose a deterioration of the catalyst by using detection results that the pre-catalyst oxygen sensor group and the post-catalyst oxygen sensor have obtained over a plurality of catalyst deterioration diagnosis periods.

These and other objects, features, aspects, and advantages of the present teaching will become more apparent from the following detailed description of embodiment(s) of the present teaching, with reference to the accompanying drawings. As used herein, the term "and/or" includes any and all combinations of one or more of the associated listed items. As used herein, the terms "including," "comprising," or "having," and variations thereof specify the presence of stated features, steps, operations, elements, components, and/or equivalents thereof, and can include one or more of steps, operations, elements, components, and/or their groups. Unless otherwise defined, all terms (including technical and scientific terms) used herein have the same meaning as commonly understood by one of ordinary skill in the art to which the present teaching belongs. It will be further understood that terms, such as those defined in commonly used dictionaries, should be interpreted as having a meaning that is consistent with their meaning in the context of the present disclosure and relevant art and should not be interpreted in an idealized or overly formal sense unless expressly so defined herein. It will be understood that the description of the present teaching discloses a number of techniques and steps. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims. In the description given below, for the purposes of explanation, numerous specific details are set forth in order to provide a thorough understanding of the present teaching. It will be apparent, however, that those skilled in the art may practice the present teaching without these specific details. The present disclosure is to be considered as an exemplification of the present teaching, and is not intended to limit the present teaching to the specific embodiments illustrated by the drawings or descriptions provided below.

Advantageous Effects of Invention

According to the present teaching, it is possible to achieve both detection of a catalyst deterioration and detection of a cylinder-to-cylinder imbalance in air-fuel ratio without using an air-fuel ratio sensor, in a multi-cylinder engine unit, which is on a premise that the amount of air to be supplied to cylinders can vary from cylinder to cylinder.

DESCRIPTION OF EMBODIMENTS

In the following, individual throttle-type or unequal interval combustion-type multi-cylinder engine units according to some embodiments of the present teaching will be described with reference to the drawings. Here, it should be noted that the embodiments described below are merely examples. The present teaching should not be construed as being limited in any way by the embodiments described below.

First Embodiment

Figure 1:
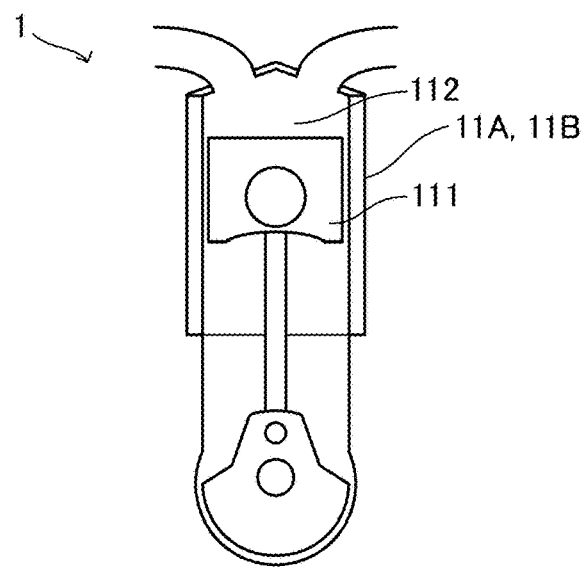
FIG. 1(A) schematically shows a combustion chamber and its neighborhood in a multi-cylinder engine unit according to first embodiment, and FIG. 1(B) schematically shows the entirety of the multi-cylinder engine unit according to the first embodiment.
Figure 1:
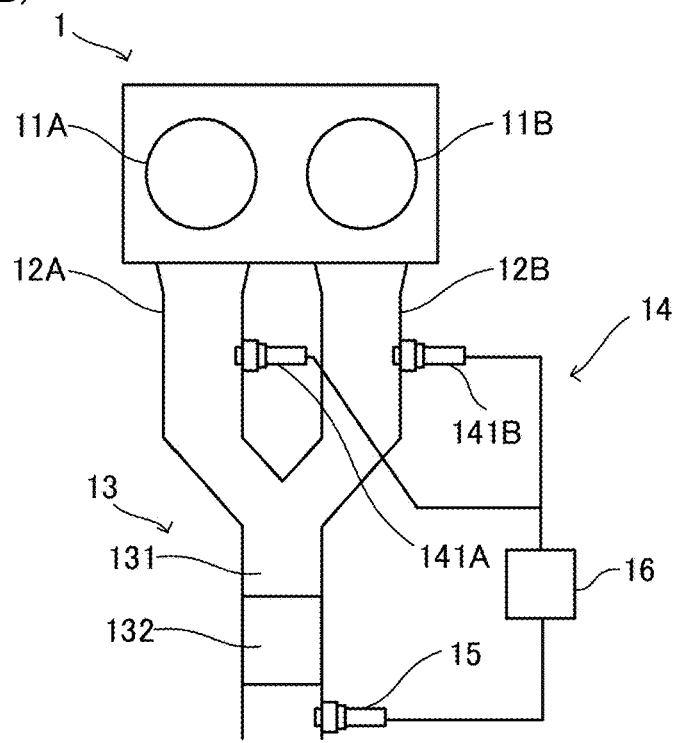

FIG. 1(A) schematically shows a combustion chamber and its neighborhood in a multi-cylinder engine unit according to first embodiment. A multi-cylinder engine unit 1 is a two-cylinder engine unit of an individual throttle-type and also of an unequal interval combustion-type. The multi-cylinder engine unit 1 includes a plurality of cylinders 11A, 11B.

Each of the plurality of cylinders 11A, 11B cooperates with a piston 111 to define a combustion chamber 112. The plurality of cylinders 11A, 11B are arranged in series. Each of the plurality of cylinders 11A, 11B has a cylindrical internal space, which constitutes a part of the combustion chamber 112. Each piston 111 has a columnar shape. The pistons 111 are arranged in the internal spaces of the corresponding cylinders 11A, 11B, respectively, for reciprocal motion therein. Each piston 111 is coupled to a crankshaft via a connecting rod. The combustion chamber 112 is formed in each of the plurality of cylinders 11A, 11B. Each combustion chamber 112 is coupled to an intake pipe. In each combustion chamber 112, a combustion of a fuel-air mixed gas coming from the intake pipe takes place. The combustion of the mixed gas produces an exhaust gas.

FIG. 1(B) schematically shows the entirety of the multi-cylinder engine unit according to the first embodiment. The multi-cylinder engine unit 1 further includes a plurality of individual exhaust pipes 12A, 12B, an exhaust manifold 13, a pre-catalyst oxygen sensor group 14, a post-catalyst oxygen sensor 15, and a control device 16.

The plurality of individual exhaust pipes 12A, 12B are disposed corresponding to the plurality of cylinders 11A, 11B, respectively. The plurality of individual exhaust pipes 12A, 12B are individual and separate from each other. To the plurality of individual exhaust pipes 12A, 12B, exhaust gases coming from the corresponding cylinders 11A, 11B flow. The downstream ends of the plurality of individual exhaust pipes 12A, 12B are each coupled to the exhaust manifold 13.

The exhaust manifold 13 includes a merge portion 131 and a catalyst 132. The merge portion 131 is where the plurality of individual exhaust pipes 12A, 12B merge together. The catalyst 132 is disposed downstream of the merge portion 131 in a flow direction of the exhaust gas. The exhaust gases coming from the plurality of cylinders 11A, 11B flow to the merge portion 131. The catalyst 132 is a three-way catalyst, for example. The catalyst 132 cleans the exhaust gas flowing in the exhaust manifold 13.

The pre-catalyst oxygen sensor group 14 is disposed at a location in a path of the exhaust gas, the location being between the plurality of cylinders 11A, 11B and the catalyst 132, such that the pre-catalyst oxygen sensor group 14 exists on paths of all the exhaust gases flowing into the catalyst 132 respectively from the plurality of cylinders 11A, 11B. The pre-catalyst oxygen sensor group 14 detects the percentage (rich/lean) of oxygen in the exhaust gas. The pre-catalyst oxygen sensor group 14 includes at least one individual oxygen sensors 141A, 141B that each is provided any of individual exhaust pipes, the number of the at least one individual oxygen sensors 141A, 141B being the same as, or one less than the total number of the individual exhaust pipes 12A, 12B. In the first embodiment, the pre-catalyst oxygen sensor group 14 includes a plurality of individual oxygen sensors 141A, 141B, which are provided to the plurality of individual exhaust pipes 12A, 12B, respectively. Each of the individual oxygen sensors 141A, 141B detects the percentage of oxygen in the exhaust gas in the corresponding individual exhaust pipe 12A, 12B.

The post-catalyst oxygen sensor 15 is disposed at a location in the exhaust manifold 13, the location being downstream of the catalyst 132 in the flow direction of the exhaust gas. The post-catalyst oxygen sensor 15 detects the percentage (rich/lean) of oxygen in the exhaust gas having passed through the catalyst 132.

The plurality of individual oxygen sensors 141A, 141B, and the post-catalyst oxygen sensor 15 are each electrically connected to the control device 16. The plurality of individual oxygen sensors 141A, 141B, and the post-catalyst oxygen sensor 15 each transmit the detected percentage of oxygen, as a detection result, to the control device 16.

The control device 16 uses the detection results obtained by the pre-catalyst oxygen sensor group 14, to detect a cylinder-to-cylinder imbalance in air-fuel ratio between the plurality of cylinders 11A, 11B, and also uses the detection result obtained by the post-catalyst oxygen sensor 15 as well as the detection results obtained by the whole or a part of the pre-catalyst oxygen sensor group 14, to detect a deterioration of the catalyst 132. With this configuration, the control device 16 detects both the cylinder-to-cylinder imbalance in air-fuel ratio between the plurality of cylinders 11A, 11B and the deterioration of the catalyst 132 not by using an air-fuel ratio sensor but instead by using the pre-catalyst oxygen sensor group 14 and the post-catalyst oxygen sensor 15. More specifically, in the first embodiment, the control device 16 detects the cylinder-to-cylinder imbalance in air-fuel ratio between the plurality of cylinders 11A, 11B by using the detection results obtained by each of the plurality of individual oxygen sensors 141A, 141B. The plurality of individual oxygen sensors 141A, 141B, which correspond to the whole of the pre-catalyst oxygen sensor group 14, detect the percentage of oxygen in the exhaust gas upstream of the catalyst 132, and the post-catalyst oxygen sensor 15 detects the percentage of oxygen in the exhaust gas downstream of the catalyst 132, so that the control device 16 is able to detect the deterioration of the catalyst 132.

Detection of Cylinder-to-Cylinder Imbalance in Air-Fuel Ratio

Figure 2:
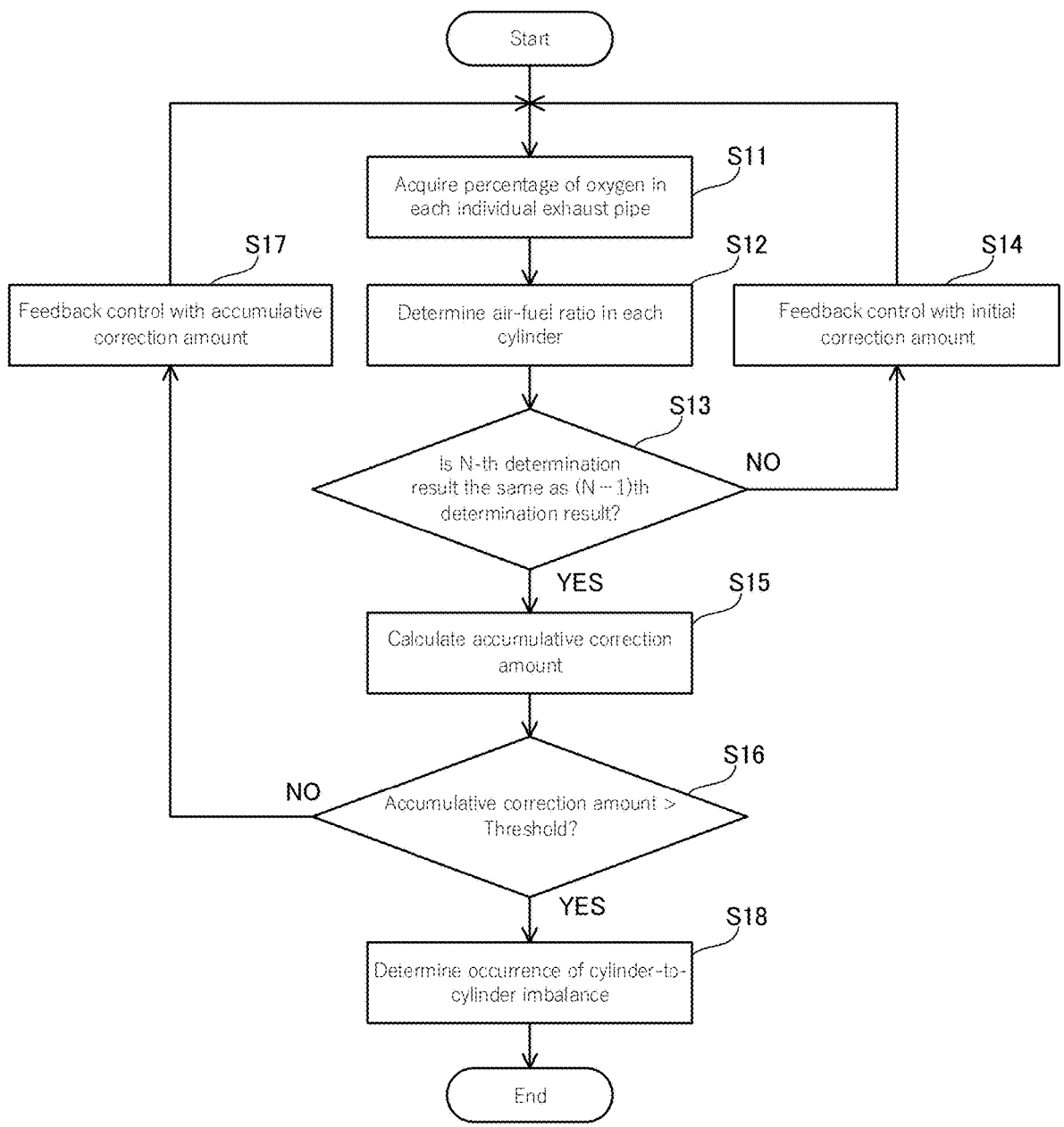
FIG. 2 is a flowchart of a detection process for detecting a cylinder-to-cylinder imbalance in air-fuel ratio according to the first embodiment.

FIG. 2 is a flowchart of a detection process for detecting the cylinder-to-cylinder imbalance in air-fuel ratio according to the first embodiment. The control device 16 performs, on each of the plurality of cylinders 11A, 11B, the detection process for detecting the cylinder-to-cylinder imbalance in air-fuel ratio. Assumed herein is a state where the multi-cylinder engine unit 1 is already operating.

First, the control device 16 acquires the percentages of oxygen in the exhaust gases in the respective individual exhaust pipes 12A, 12B, which are obtained by the plurality of individual oxygen sensors 141A, 141B, respectively. The control device 16 acquires the percentages of oxygen from the plurality of individual oxygen sensors 141A, 141B at regular or irregular intervals (step S11).

Then, based on the detection results acquired from the plurality of individual oxygen sensors 141A, 141B, the control device 16 determines whether the air-fuel ratio in each of the cylinders 11A, 11B is rich or lean relative to a desired air-fuel ratio (step S12).

Then, the control device 16 compares a determination result against a previous determination result. For example, if the control device 16 acquires the percentages of oxygen that the plurality of individual oxygen sensors 141A, 141B have detected for the first time after the multi-cylinder engine unit 1 started operating; the previous (0th) determination result does not exist, and therefore the control device 16 determines that the first-time determination result is different from the previous determination result. Thus, the control device 16 compares the N-th determination result against the (N−1)th determination result (step S13).

If the N-th determination result and the (N−1)th determination result for a certain cylinder are different (step S13: NO), the control device 16 executes a feedback control in which the amount of fuel to be supplied to the determination object cylinder is corrected by a predetermined initial correction amount so as to cancel the N-th determination result. Here, it is not always required that the feedback control using the initial correction amount make the next (N+1)th determination result different from the Nth determination result. For example, if the (N−1)th determination result for a certain cylinder is leanness while the N-th determination result for the certain cylinder is richness, the control device 16 decreases the amount of fuel supply by a predetermined amount so as to make the (N+1)th determination result leanness (so as to cancel the determination of being rich) (step S14).

The control device 16 controls the fuel supply to each of the cylinders 11A, 11B such that the determination result on the air-fuel ratio in each of the cylinders 11A, 11B repeatedly alternates between richness and leanness at some intervals. This allows the air-fuel ratio in each of the cylinders 11A, 11B to be kept at a value close to the desired air-fuel ratio. Even such a feedback control may not improve the richness or leanness of the air-fuel ratio due to some factor, however.

If the N-th determination result is the same as the (N−1)th determination result (step S13: YES), the control device 16 calculates an accumulative correction amount (step S15).

Then, the control device 16 compares the accumulative correction amount thus calculated against a predetermined threshold (step S16).

If the accumulative correction amount is not more than the threshold (step S16: NO), the control device 16 executes a feedback control on the determination object cylinder, in which the amount of fuel supply is corrected by the calculated accumulative correction amount so as to cancel the N-th determination result (step S17).

If, after the execution of the feedback control using the accumulative correction amount, a new determination result is different from the previous determination result (step S13: NO), the control device 16 executes another feedback control so as to cancel the new determination result by using the initial correction amount again. If, even after the execution of the feedback control using the accumulative correction amount, a new determination result is the same as the previous determination result (step S13: YES), the control device 16 calculates a new accumulative correction amount whose value is further increased as compared to the previous accumulative correction amount (step S15). That is, if the richness or leanness of the air-fuel ratio is not improved by the execution of the feedback control using the accumulative correction amount, the control device 16 increments the accumulative correction amount for each feedback control. The first-time accumulative correction amount, and the amount of change in correction amount for each feedback control, may be prescribed. As a result of repeatedly executing such a feedback control, the calculated accumulative correction amount can sometimes exceed the threshold.

If the accumulative correction amount is greater than the threshold (step S16: YES), the control device 16 determines that a cylinder-to-cylinder imbalance in air-fuel ratio is occurring in the determination object cylinder (step S18).

Figure 3:
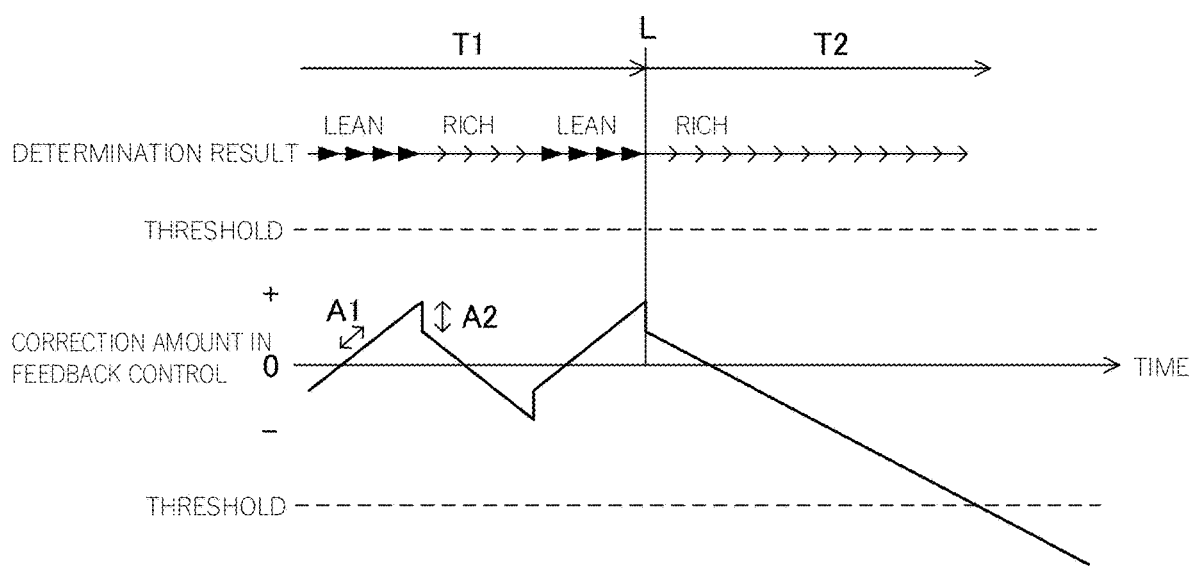
FIG. 3 shows an example of a change in fuel correction amount in the event that a cylinder-to-cylinder imbalance occurs in a certain cylinder of the multi-cylinder engine unit according to the first embodiment.

FIG. 3 shows an example of a change in fuel correction amount in the event that a cylinder-to-cylinder imbalance occurs in a certain cylinder of the multi-cylinder engine unit according to the first embodiment. In FIG. 3, the horizontal axis represents time, and the vertical axis represents the correction amount of fuel to be supplied to the cylinder 11A, which is an object of the feedback control. It can be seen that in a period T1, the object cylinder 11A is normal, and in a period T2, a cylinder-to-cylinder imbalance in air-fuel ratio is occurring in the object cylinder 11A. The determination result on the air-fuel ratio in the object cylinder is also shown as a reference. Each of the arrows shown in the determination result section indicates one determination.

At the beginning of the period T1, the control device 16 determines that the air-fuel ratio in the object cylinder 11A is lean multiple times successively, based on the detection result acquired from the individual oxygen sensor 141A. In this case, the control device 16 repeatedly executes a feedback control using an accumulative correction amount A1. In every feedback control, the control device 16 increments the accumulative correction amount A1. In other words, the control device 16 increases the amount of fuel to be supplied to the object cylinder 11A in every feedback control.

Then, the control device 16 determines that the air-fuel ratio in the object cylinder 11A is rich. In this case, the control device 16 executes an feedback control using an initial correction amount A2. The control device 16 executes the feedback control so as to cancel the leanness, which is the previous determination result. That is, the control device 16 decreases the amount of fuel to be supplied to the object cylinder 11A by the initial correction amount.

Then, the control device 16 determines that the air-fuel ratio in the object cylinder 11A is rich multiple times successively. In this case, in every feedback control, the control device 16 decreases the amount of fuel to be supplied to the object cylinder 11A by the accumulative correction amount A1. In the period T1, the object cylinder 11A is normal. Therefore, the determination result on the air-fuel ratio in the object cylinder 11A, which is provided by the control device 16, repeatedly alternates between richness and leanness on the whole on a certain delimited period basis. Thus, the air-fuel ratio in the object cylinder 11A is kept at a value close to the desired air-fuel ratio.

Also in the period T2, the control device 16 continues making a determination about the air-fuel ratio in the object cylinder 11A based on the detection result acquired from the individual oxygen sensor 141A. In the period T2, however, the cylinder-to-cylinder imbalance in air-fuel ratio is occurring in the object cylinder 11A, and therefore the determination result may sometimes not be canceled even though a feedback control is executed. For example, as shown in the drawing, a feedback control (a feedback control using the accumulative correction amount) for decreasing the fuel to be supplied to the object cylinder 11A is executed immediately after a boundary line L at which occurrence of the cylinder-to-cylinder imbalance in air-fuel ratio starts. As a result of the execution of this feedback control, the fuel to be supplied to the object cylinder 11A is decreased in every feedback control. Thus, the control device 16 is supposed to determine that the air-fuel ratio in the object cylinder 11A is lean, after the feedback control is repeated multiple times.

In this respect, however, the determination on the air-fuel ratio in the object cylinder 11A continuously remains richness, because something abnormal is occurring in the object cylinder 11A. Thus, the accumulative correction amount increases in every feedback control, so that the amount of fuel to be supplied to the object cylinder 11A continues to be decreased.

As for the accumulative correction amount used in the feedback control, a threshold is set in advance. If the calculated accumulative correction amount exceeds the threshold, the control device 16 determines that a cylinder-to-cylinder imbalance in air-fuel ratio is occurring in the object cylinder 11A. Upon detection of the cylinder-to-cylinder imbalance, the control device 16 executes a process for notifying a driver or the like that the engine unit needs to be inspected.

Detection of Catalyst Deterioration

Figure 4:
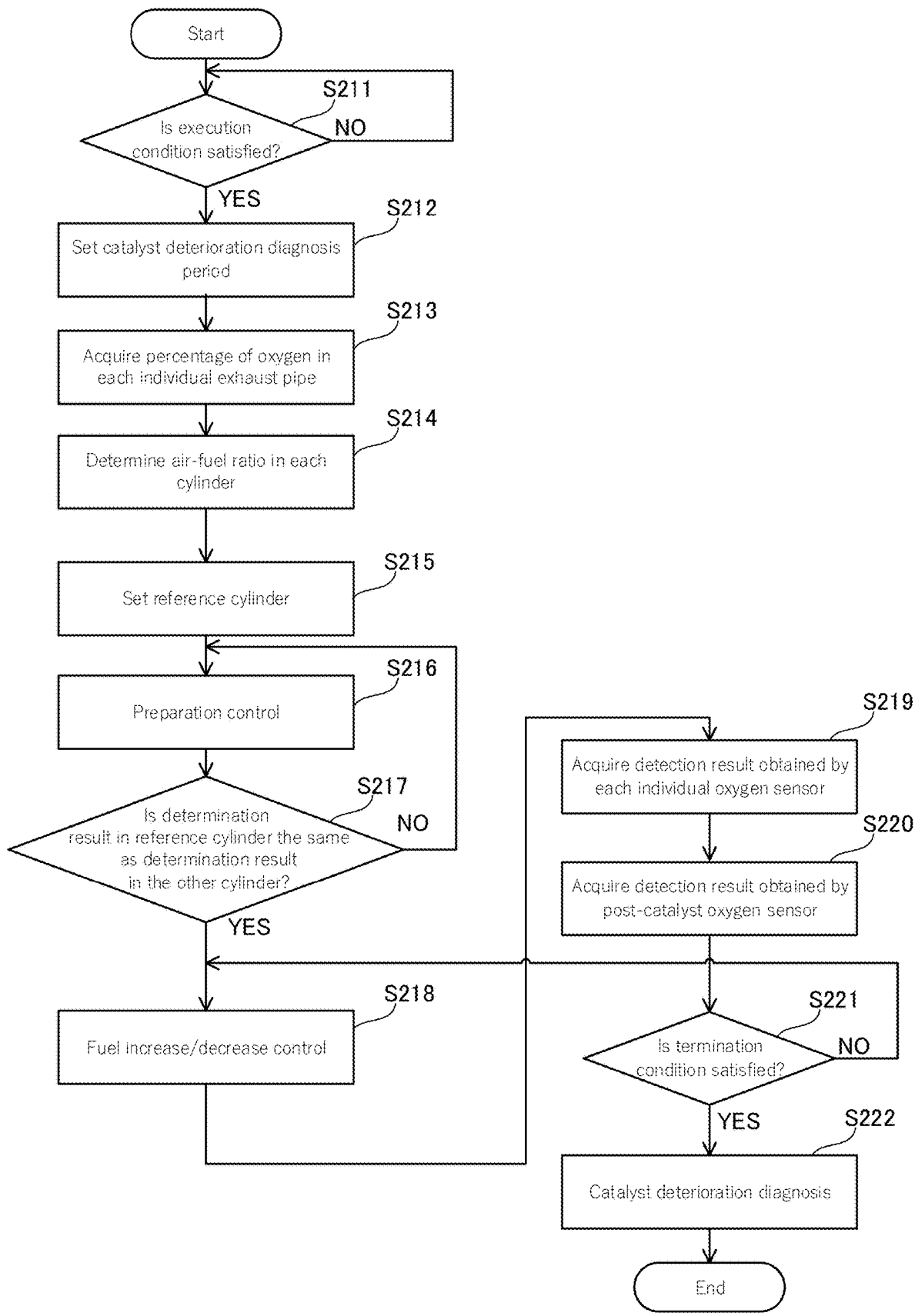
FIG. 4 is a flowchart of a detection process for detecting a catalyst deterioration according to the first embodiment.

FIG. 4 is a flowchart of a detection process for detecting a catalyst deterioration according to the first embodiment. Assumed herein is a state where the multi-cylinder engine unit 1 is already operating.

First, the control device 16 determines whether or not an execution condition for the catalyst deterioration diagnosis is satisfied. The execution condition is, for example, that it be a temperature that makes the catalyst active (step S211).

If the execution condition for the catalyst deterioration diagnosis is not satisfied (step S211: NO), the control device 16 continues the determination of whether or not the execution condition for the catalyst deterioration diagnosis is satisfied. If the execution condition for the catalyst deterioration diagnosis is satisfied (step S211: YES), the control device 16 sets a catalyst deterioration diagnosis period (step S212).

Then, in at least a part of the catalyst deterioration diagnosis period, the control device 16 acquires the percentages of oxygen in the exhaust gases in the respective individual exhaust pipes 12A, 12B, the percentages of oxygen being detected by the plurality of individual oxygen sensors 141A, 141B. The control device 16 acquires the percentages of oxygen from the plurality of individual oxygen sensors 141A, 141B at regular or irregular intervals (step S213).

Then, based on the detection results acquired from the plurality of individual oxygen sensors 141A, 141B, the control device 16 determines whether the air-fuel ratio in each of the cylinders 11A, 11B is rich or lean relative to the desired air-fuel ratio (step S214).

Then, the control device 16 sets the cylinder 11A from among the plurality of cylinders 11A, 11B to be a reference cylinder. The reference cylinder is not particularly limited, and may be set in advance, or may be randomly selected from among the plurality of cylinders 11A, 11B (step S215). The control device 16 sets the cylinder 11B, which is a cylinder other than the reference cylinder 11A, to be a dependent cylinder.

Then, the control device 16 executes a preparation control in order to make the determination results on the air-fuel ratios in the plurality of cylinders 11A, 11B uniform (step S216 and step S217). More specifically, the control device 16 controls the fuel to be supplied to the reference cylinder 11A so as to maintain the determination result on the air-fuel ratio in the reference cylinder 11A (that is, the air-fuel ratio in the exhaust gas in the individual exhaust pipe 12A corresponding to the reference cylinder 11A). For example, if the determination result on the reference cylinder 11A is richness, the control device 16 controls the fuel to be supplied to the reference cylinder 11A such that the determination result on the reference cylinder 11A continuously remains richness. The control device 16 controls the fuel to be supplied to the dependent cylinder 11B such that the determination result on the air-fuel ratio in the dependent cylinder 11B (that is, the air-fuel ratio in the exhaust gas in the individual exhaust pipe 12B corresponding to the dependent cylinder 11B) can be the same as the determination result on the air-fuel ratio in the reference cylinder 11A. For example, if the determination result on the dependent cylinder 11B is leanness, the control device 16 controls the fuel to be supplied to the dependent cylinder 11B such that the determination result on the dependent cylinder 11B can be richness, which is the same as the determination result on the reference cylinder 11A (step S216).

Then, the control device 16 compares the determination result on the air-fuel ratio in the reference cylinder 11A against the determination result on the air-fuel ratio in the dependent cylinder 11B (step S217).

If the determination result on the air-fuel ratio in the reference cylinder 11A is different from the determination result on the air-fuel ratio in the dependent cylinder 11B (step S217: NO), the control device 16 keeps controlling the fuel to be supplied to the reference cylinder 11A and the dependent cylinder 11B so as to maintain the determination result on the air-fuel ratio in the reference cylinder 11A until the determination result for the dependent cylinder 11B becomes the same as the determination result for the reference cylinder 11A (return to step S216).

Then, if the determination results on the air-fuel ratios in both the reference cylinder 11A and the dependent cylinder 11B become the same, the control device 16 executes a fuel increase/decrease control (step S218). More specifically, the control device 16 controls the fuel to be supplied to the reference cylinder 11A and the dependent cylinder 11B so as to cancel the determination result obtained in step S217. That is, the control device 16 controls the fuel to be supplied to the reference cylinder 11A and the dependent cylinder 11B such that determination results on the air-fuel ratios in the reference cylinder 11A and the dependent cylinder 11B become different from the detection results obtained in the preparation control (step S217). Here, suppose an example case in which both of the determination results on the air-fuel ratios in the reference cylinder 11A and the dependent cylinder 11B are richness in step S217. In this case, the control device 16 simultaneously decreases the amounts of fuel to be supplied to the reference cylinder 11A and the dependent cylinder 11B, to control the fuel supply such that determination results on the air-fuel ratios both in the reference cylinder 11A and in the dependent cylinder 11B can become leanness.

Then, after determination results on the air-fuel ratios become leanness, which is different from the determination results obtained in step S217, the control device 16 increases the fuel to be supplied to the reference cylinder 11A and the dependent cylinder 11B such that determination results on the air-fuel ratios in the reference cylinder 11A and the dependent cylinder 11B can become richness. That is, after the determination results on the air-fuel ratios in the reference cylinder 11A and the dependent cylinder 11B become different from the detection results obtained in the preparation control (step S217), the control device 16 controls the fuel to be supplied to the reference cylinder 11A and the dependent cylinder 11B such that their determination results become the same again as those obtained in the preparation control (step S218).

Then, the control device 16 acquires the percentages of oxygen in the exhaust gases before passing through the catalyst 132 (step S219), which are detected by the individual oxygen sensors 141A, 141B, respectively. Then, the control device 16 acquires the percentage of oxygen in the exhaust gas having passed through the catalyst 132, which is detected by the post-catalyst oxygen sensor 15 (step S220). Here, the order of step S219 and S220 does not matter.

Then, the control device 16 determines whether or not a termination condition for the catalyst deterioration diagnosis is satisfied (step S221). The termination condition is, for example, an elapse of a catalyst deterioration diagnosis period. If the termination condition for the catalyst deterioration diagnosis is not satisfied (step S221: NO), the control device 16 executes the fuel increase/decrease control again (return to step S218). In this manner, for the catalyst deterioration diagnosis period, the control device 16 controls the fuel to be supplied to the respective cylinders 11A, 11B such that the determination results on the air-fuel ratios both in the reference cylinder 11A and in the dependent cylinder 11B can repeatedly alternate between richness and leanness simultaneously. At this time, the determination results on the air-fuel ratios in the respective cylinders 11A, 11B are on the basis of the determination result on the air-fuel ratio in the reference cylinder 11A. In other words, the determination result on the air-fuel ratio in the dependent cylinder 11B is considered as the same as the determination result on the air-fuel ratio in the reference cylinder 11A.

If the termination condition for the catalyst deterioration diagnosis is satisfied (step S221: YES), the control device 16 compares the detection result acquired from the post-catalyst oxygen sensor 15 against the detection result acquired from the individual oxygen sensor 141A, which corresponds to the reference cylinder 11A, to determine a deterioration of the catalyst 132 (step S222).

Figure 5:
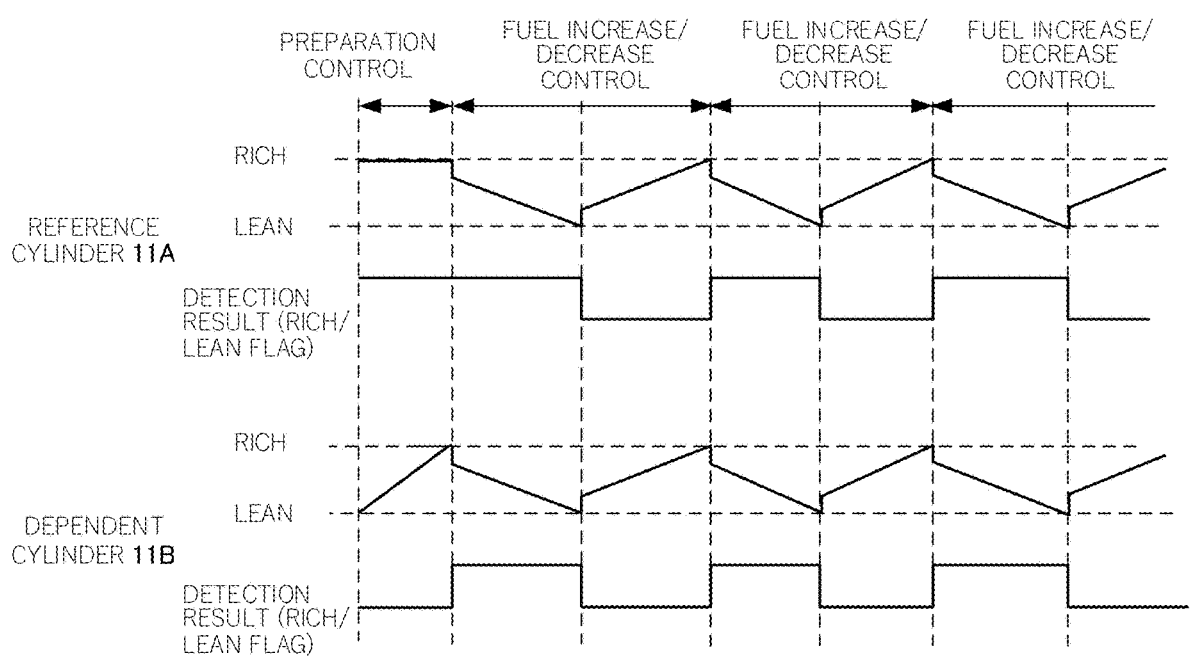
FIG. 5 is a timing chart of an injector signal and a detection result from a pre-catalyst oxygen sensor group in a catalyst deterioration diagnosis according to the first embodiment.

FIG. 5 is a timing chart of an injector signal and a detection result from the pre-catalyst oxygen sensor group in the catalyst deterioration diagnosis according to the first embodiment. Upon fulfillment of the execution condition for the catalyst deterioration diagnosis, the control device 16 executes the preparation control. In the preparation control, the control device 16 transmits an injector signal so as to make the air-fuel ratios in the reference cylinder 11A and the dependent cylinder 11B uniform. Assumed herein is a case where, before the preparation control, the detection result on the air-fuel ratio in the reference cylinder 11A is richness and the detection result on the air-fuel ratio in the dependent cylinder 11B is leanness. Thus, the control device 16 transmits the injector signal such that the detection result on the air-fuel ratio in the reference cylinder 11A can remain richness while the detection result on the air-fuel ratio in the dependent cylinder 11B can change from leanness to richness. If the detection results on the air-fuel ratios in the reference cylinder 11A and the dependent cylinder 11B become richness uniformly, the control device 16 terminates the preparation control.

After the termination of the preparation control, the control device 16 executes the fuel increase/decrease control. In the fuel increase/decrease control, based on a signal received from the individual oxygen sensor 141A, which detects the percentage of oxygen in the exhaust gas in the individual exhaust pipe 12A corresponding to the reference cylinder 11A, the control device 16 controls the amounts of fuel to be supplied to the reference cylinder 11A and the dependent cylinder 11B such that the air-fuel ratios in the reference cylinder 11A and the dependent cylinder 11B become lean, which is different from the detection result (rich) obtained in the preparation control, and then become rich again. The control device 16 executes the fuel increase/decrease control until the termination condition for the catalyst deterioration diagnosis is fulfilled. The control device 16 executes the fuel increase/decrease control multiple times. In this manner, the control device 16 supplies the fuel to the reference cylinder 11A and the dependent cylinder 11B according to a set pattern (diagnosis-purpose fuel supply pattern) such that the air-fuel ratios in the reference cylinder 11A and the dependent cylinder 11B repeatedly alternate between richness and leanness. Consequently, the detection results obtained by the individual oxygen sensors 141A, 141B follow a pattern (diagnosis-purpose air-fuel ratio pattern) of repeatedly alternating between richness and leanness. After terminating the fuel increase/decrease control, the control device 16 diagnoses a deterioration of the catalyst.

Here, it may be acceptable that the control device 16 executes a period measurement control at a time between the preparation control and the fuel increase/decrease control. The period measurement control is executed for the purpose of determining a period of increasing/decreasing the fuel to be supplied to the respective cylinders 11A, 11B in the fuel increase/decrease control. For example, in the period measurement control, the control device 16 measures a period until the air-fuel ratios in the respective cylinders 11A, 11B, which have been uniformly rich (or lean) as a result of the preparation control, become lean (or rich) once and then become rich (or lean) again. The control device 16 executes the fuel increase/decrease control based on the period measured in the period measurement control. The period of increasing/decreasing the fuel to be supplied to the respective cylinders 11A, 11B in the fuel increase/decrease control may be equal to or longer than the period measured in the period measurement control.

Figure 6:
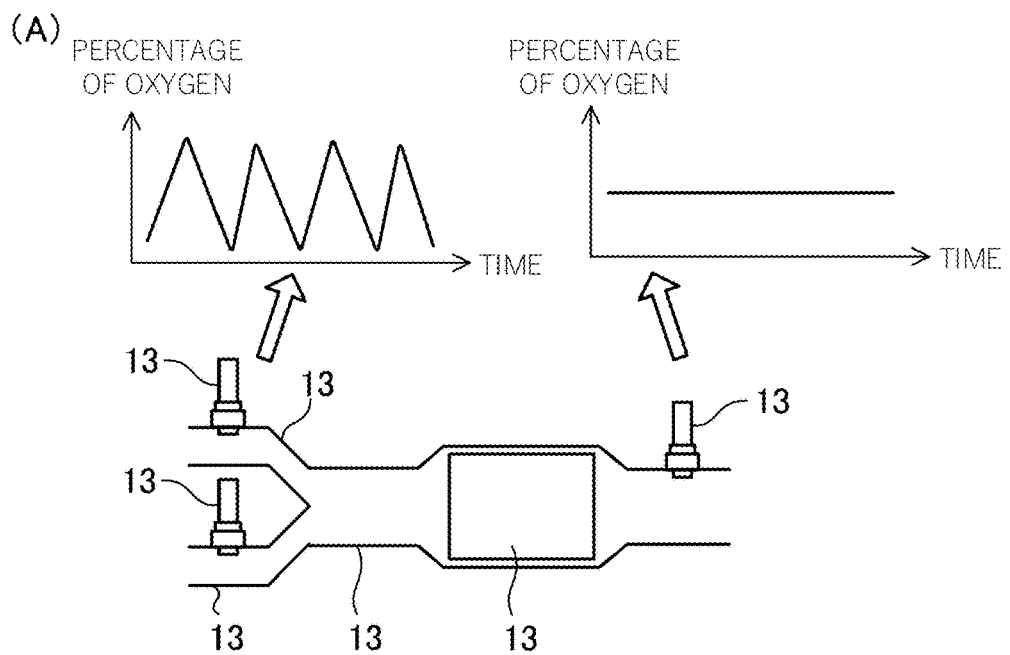
FIG. 6(A) shows a result that gives a determination that a catalyst is normal in the catalyst deterioration diagnosis according to the first embodiment.
FIG. 6(B) shows a result that gives a determination that the catalyst is deteriorated in the catalyst deterioration diagnosis according to the first embodiment.
Figure 6:
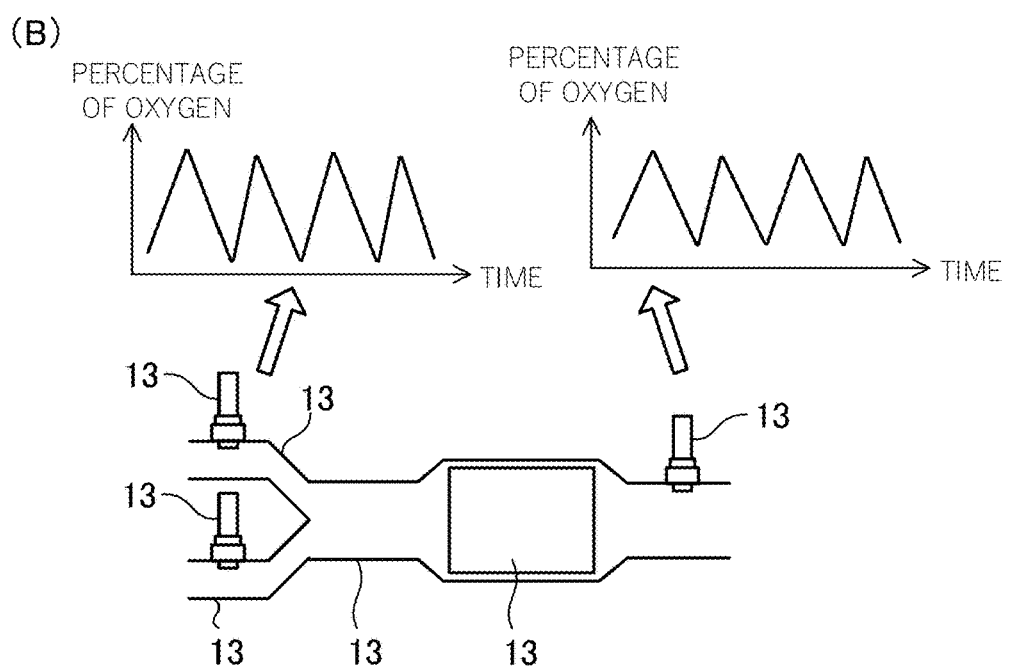

FIG. 6(A) shows a result that gives a determination that the catalyst is normal in the catalyst deterioration diagnosis according to the first embodiment, and FIG. 6(B) shows a result that gives a determination that the catalyst is deteriorated in the catalyst deterioration diagnosis according to the first embodiment.

Referring to FIG. 6(A), the control device 16, in diagnosing a deterioration of the catalyst 132, controls the fuel to be supplied to the respective cylinders such that determination results on the air-fuel ratios in all the plurality of cylinders 11A, 11B can repeatedly alternate between richness and leanness simultaneously. The air-fuel ratio in the exhaust gas flowing into the catalyst 132 repeatedly alternates between richness and leanness. The catalyst 132, if normal, has an oxygen storage capacity, and thus releases stored oxygen when an exhaust gas that is rich in air-fuel ratio flows into the catalyst 132. When an exhaust gas that is lean in air-fuel ratio flows into the catalyst 132, the catalyst 132 stores oxygen of the exhaust gas. Consequently, the percentage of oxygen in the exhaust gas being rich in air-fuel ratio and flowing into the catalyst 132 is generally equal to the percentage of oxygen in the exhaust gas being lean in air-fuel ratio and flowing into the catalyst 132. Accordingly, the post-catalyst oxygen sensor 15 detects the percentage of oxygen that is generally constant.

Referring to FIG. 6(B), the catalyst 132, if deteriorated, has a low oxygen storage capacity. When an exhaust gas that is rich in air-fuel ratio flows into the deteriorated catalyst 132, the deteriorated catalyst 132 does not release an appropriate amount of oxygen. When an exhaust gas that is lean in air-fuel ratio flows into the deteriorated catalyst 132, the deteriorated catalyst 132 does not store an appropriate amount of oxygen. Consequently, the percentage of oxygen in the exhaust gas being rich in air-fuel ratio and flowing into the catalyst 132 and the percentage of oxygen in the exhaust gas being lean in air-fuel ratio and flowing into the catalyst 132 are generally unchanged between before and after the exhaust gas passes through the catalyst 132. Accordingly, in the detection result obtained by the post-catalyst oxygen sensor 15, the air-fuel ratio in the exhaust gas repeatedly alternates between richness and leanness, in the same manner as the detection results obtained by the individual oxygen sensors 141A, 141B. In such a case, the control device 16 determines that the catalyst 132 is deteriorated. Upon detecting the deterioration of the catalyst 132, the control device 16 executes a process for notifying a driver or the like that the catalyst 132 needs to be inspected.

Variation

Figure 7:
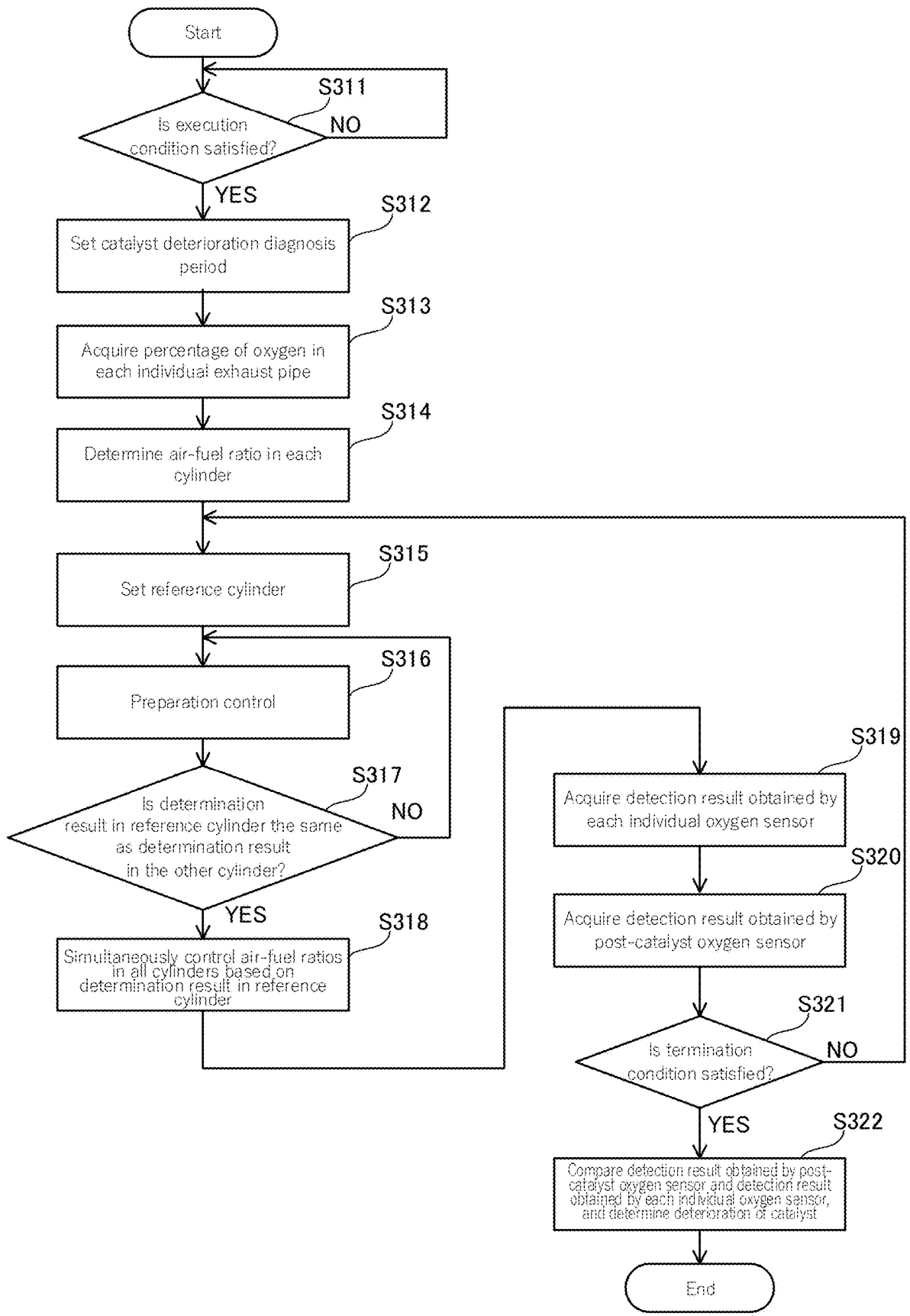
FIG. 7 is a flowchart of a detection process for detecting a catalyst deterioration according to a variation of the first embodiment.

FIG. 7 is a flowchart of a detection process for detecting a catalyst deterioration according to a variation of the first embodiment. In the catalyst deterioration diagnosis of the first embodiment described above, the reference cylinder 11A that is initially set is fixed, and the fuel increase/decrease control is executed based on a determination result on the air-fuel ratio in this reference cylinder 11A. In the variation, on the other hand, a reference cylinder is set each time a fuel increase/decrease control is executed. The variation is different from the foregoing description only in terms of a detection process for detecting a catalyst deterioration, and a structure of a multi-cylinder engine unit 1 itself is identical to that of the foregoing description. Since step S311 to step S320 are identical to step S211 to step S220 described above, descriptions of these steps may be omitted as appropriate.

The control device 16, in step S315, sets the cylinder 11A to be a first-time reference cylinder, and sets the cylinder 11B to be a first-time dependent cylinder. If determination results on the air-fuel ratios in the reference cylinder 11A and the dependent cylinder 11B become the same (step S317: YES) as a result of the preparation control, the control device 16 executes the fuel increase/decrease control (step S318) for controlling the fuel to be supplied to the reference cylinder 11A and the dependent cylinder 11B such that determination results on the air-fuel ratios in the reference cylinder 11A and the dependent cylinder 11B once become different from, and then again become the same as the detection results obtained in the preparation control (step S317).

Then, after executing step S319 and S320, the control device 16 determines whether or not the termination condition for the catalyst deterioration diagnosis is satisfied (step S321). If the termination condition for the catalyst deterioration diagnosis is not satisfied (step S321: NO), the control device 16 again sets either one of the plurality of cylinders 11A, 11B to be a reference cylinder (return to step S315). Set as the second and subsequent-time reference cylinders are, for example, a cylinder that has shown the fastest change of the determination result on the air-fuel ratio as a result of the fuel increase/decrease control in step S318. Here, the second and subsequent-time reference cylinders are not particularly limited, and may be preset or may be randomly selected from among the plurality of cylinders 11A, 11B. Then, the control device 16 repeats step S315 to step S320 until the termination condition for the catalyst deterioration diagnosis is satisfied (step S321: YES). In this manner, the control device according to the variation of the first embodiment, in the catalyst deterioration diagnosis, sets a reference cylinder each time it executes the fuel increase/decrease control (step S318).

Figure 8:
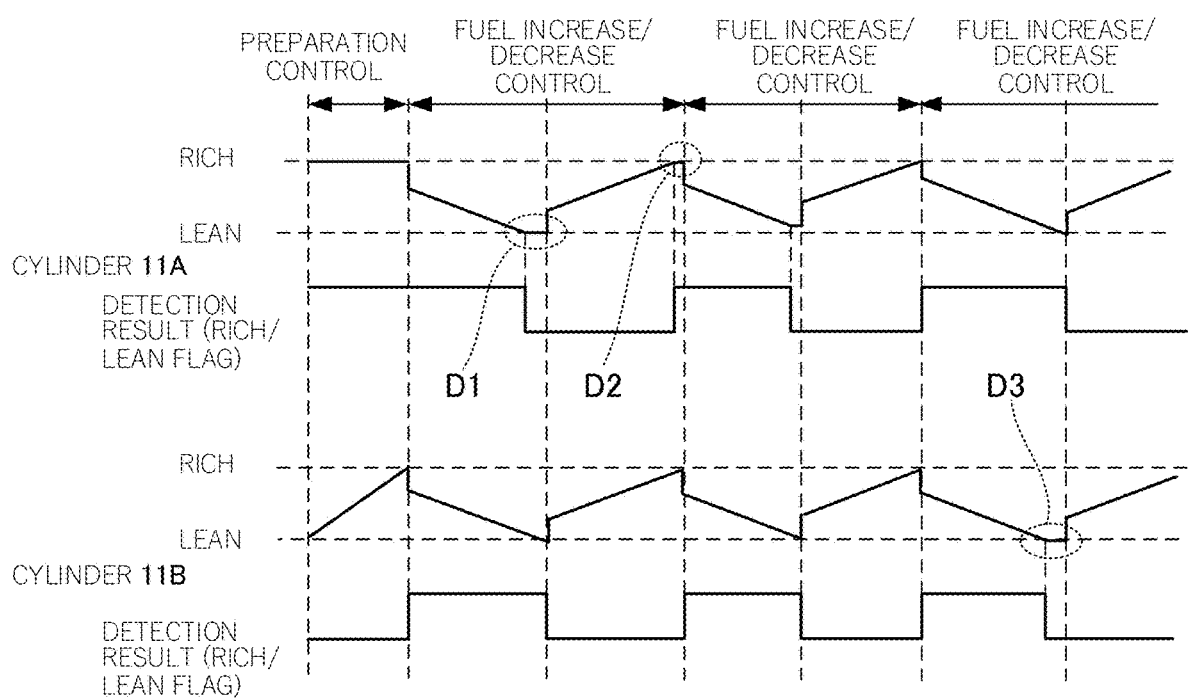
FIG. 8 is a timing chart of an injector signal and a detection result from a pre-catalyst oxygen sensor group in a catalyst deterioration diagnosis according to the variation of the first embodiment.

FIG. 8 is a timing chart of an injector signal and a detection result from the pre-catalyst oxygen sensor group in the catalyst deterioration diagnosis according to the variation of the first embodiment. Upon fulfillment of the execution condition for the catalyst deterioration diagnosis, the control device 16 sets the cylinder 11A to be the first-time reference cylinder and the cylinder 11B to be the first-time dependent cylinder, and executes the preparation control. In the preparation control, the control device 16 transmits an injector signal so as to maintain the richness of the air-fuel ratio in the cylinder 11A while changing the air-fuel ratio in the cylinder 11B from leanness to richness so that the air-fuel ratio in the reference cylinder 11A and the air-fuel ratio in the cylinder 11B can become uniform.

After the detection results on the air-fuel ratios in the cylinder 11A and the cylinder 11B become richness uniformly, the control device 16 executes a first-time fuel increase/decrease control based on a signal received from the individual oxygen sensor 141A, which corresponds to the cylinder 11A. In the fuel increase/decrease control, the air-fuel ratios in the respective cylinders 11A, 11B may sometimes not be detected simultaneously. For instance, suppose a case in which the detection result on the air-fuel ratio in the cylinder 11B is delayed as compared to the detection result on the air-fuel ratio in the cylinder 11A in the first-time fuel increase/decrease control, as indicated by D1 and D2 in the drawing. In this case, the control device 16 transmits the injector signal so as to maintain the air-fuel ratio in the cylinder 11A, whose air-fuel ratio has been detected first, until the air-fuel ratio in the cylinder 11B becomes rich or lean uniformly with the cylinder 11A. In other words, the control device 16 changes the diagnosis-purpose fuel supply pattern of the cylinder 11A so as to wait for the detection result on the air-fuel ratio in the cylinder 11B to become uniform with the detection result on the air-fuel ratio in the cylinder 11A. If the detection results on the air-fuel ratios in the cylinder 11A and the cylinder 11B become uniform, the control device 16 sets the cylinder 11A to be the reference cylinder again, and executes second and subsequent-time fuel increase/decrease controls.

Suppose another case in which the detection result on the air-fuel ratio in the cylinder 11A is delayed as compared to the detection result on the air-fuel ratio in the cylinder 11B in the fuel increase/decrease control, as indicated by D3 in the drawing. In this case, the control device 16 transmits the injector signal so as to maintain the air-fuel ratio in the cylinder 11B until the air-fuel ratio in the cylinder 11A becomes rich or lean uniformly with the cylinder 11B. If the detection results on the air-fuel ratios in the cylinder 11A and the cylinder 11B become uniform, the control device 16 sets the cylinder 11B to be the reference cylinder, and executes a subsequent fuel increase/decrease control. After terminating the fuel increase/decrease control, the control device 16 diagnoses a catalyst deterioration.

Second Embodiment

Figure 9:
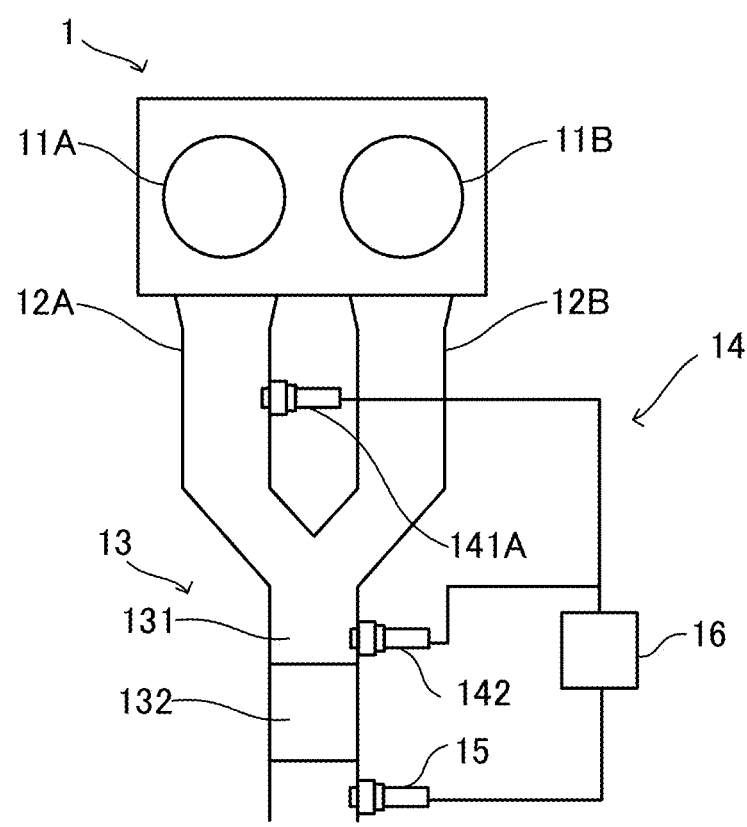
FIG. 9 schematically shows the entirety of a multi-cylinder engine unit according to second embodiment.

FIG. 9 schematically shows the entirety of a multi-cylinder engine unit according to second embodiment. A multi-cylinder engine unit 1 according to the second embodiment is different from the multi-cylinder engine unit according to the first embodiment in that one of the plurality of individual exhaust pipes 12A, 12B is provided with no individual oxygen sensor, and also that a pre-catalyst oxygen sensor 142 is disposed in a merge portion 131.

More specifically, the multi-cylinder engine unit 1 according to the second embodiment has a pre-catalyst oxygen sensor group 14 composed of at least one individual oxygen sensor 141A and the pre-catalyst oxygen sensor 142.

The individual oxygen sensor 141A is provided to the individual exhaust pipes 12A, the number of the individual oxygen sensor being one less than the total number of the individual exhaust pipes 12A, 12B. The individual oxygen sensor 141A detects the percentage of oxygen in an exhaust gas in the corresponding individual exhaust pipe 12A. The multi-cylinder engine unit 1 according to the second embodiment includes two cylinders 11A, 11B, and therefore the number of individual oxygen sensors is one. In a case of a three-cylinder engine unit, two individual oxygen sensors are provided, and in a case of a four-cylinder engine unit, three individual oxygen sensors are provided.

The pre-catalyst oxygen sensor 142 is disposed at a location in an exhaust manifold 13, the location being upstream of a catalyst 132 in a flow direction of the exhaust gas. The pre-catalyst oxygen sensor 142 detects the percentage of oxygen in the exhaust gas flowing into the catalyst 132.

The control device 16 uses detection results obtained by the at least one individual oxygen sensor 141A and the pre-catalyst oxygen sensor 142, to detect a cylinder-to-cylinder imbalance in air-fuel ratio between the plurality of cylinders 11A, 11B. The pre-catalyst oxygen sensor 142, which corresponds to a part of the pre-catalyst oxygen sensor group 14, detects the percentage of oxygen in the exhaust gas upstream of the catalyst 132, and the post-catalyst oxygen sensor 15 detects the percentage of oxygen in the exhaust gas downstream of the catalyst 132, so that the control device 16 is able to detect a deterioration of the catalyst 132.

Detection of Cylinder-to-Cylinder Imbalance in Air-Fuel Ratio

Referring to FIG. 2, a detection process for detecting a cylinder-to-cylinder imbalance in air-fuel ratio according to the second embodiment is basically identical to that of the first embodiment, except for practical measures taken in step S11 and in step S14. In the following, parts of the process different from the first embodiment will be mainly described.

In step S11, the control device 16 acquires the percentages of oxygen in the exhaust gases in the respective individual exhaust pipes 12A, 12B. In the first embodiment, the individual exhaust pipes 12A, 12B are provided with the individual oxygen sensors 141A, 141B, respectively. This allows the control device 16 to acquire the percentages of oxygen in the exhaust gases in the respective individual exhaust pipes 12A, 12B by acquiring detection results obtained by the respective individual oxygen sensors 141A, 141B. In the second embodiment, however, one individual exhaust pipe 12B is provided with no individual oxygen sensor.

In this respect, the inventors of the present teaching have investigated a path of the exhaust gas flowing through the individual exhaust pipe 12B provided with no individual oxygen sensor. The inventors of the present teaching have noted that the exhaust gas flowing in the individual exhaust pipe 12B provided with no individual oxygen sensor passes through the merge portion 131 of the exhaust manifold 13 before flowing into the catalyst 132. The inventors of the present teaching consequently have discovered that the percentage of oxygen in the exhaust gas flowing in the individual exhaust pipe 12B provided with no individual oxygen sensor can be detected by using the pre-catalyst oxygen sensor 142 disposed in the merge portion 131.

In the second embodiment, the control device 16 acquires the percentage of oxygen in the exhaust gas in the individual exhaust pipe 12A, which is detected by the individual oxygen sensor 141A, and the percentage of oxygen in the exhaust gas in the individual exhaust pipe 12B provided with no individual oxygen sensor, which is detected by the pre-catalyst oxygen sensor 142 (step S11).

Here, it may be possible that the percentage of oxygen in the exhaust gas in the individual exhaust pipe 12B provided with no individual oxygen sensor is detected by using the individual oxygen sensor 141A in addition to the pre-catalyst oxygen sensor 142. For example, the percentage of oxygen in the exhaust gas in the individual exhaust pipe 12B provided with no individual oxygen sensor may be detected by using a differential the detection result obtained by between the pre-catalyst oxygen sensor 142 and the detection result obtained by the individual oxygen sensor 141A.

The rest of the process is identical to that of the first embodiment, and therefore will not be described.

<Detection of Catalyst Deterioration

Referring to FIG. 9, the second embodiment has the pre-catalyst oxygen sensor 142 disposed in the merge portion 131 of the exhaust manifold 13. This makes it possible to directly detect the percentage of oxygen in the exhaust gas immediately before the exhaust gas flows into the catalyst 132. Accordingly, the control device 16 is capable of checking the oxygen storage capacity of the catalyst 132, that is, capable of diagnosing a deterioration of the catalyst 132, by a comparison between the detection results obtained by the pre-catalyst oxygen sensor 142 and the post-catalyst oxygen sensor 15.

Third Embodiment

Figure 10:
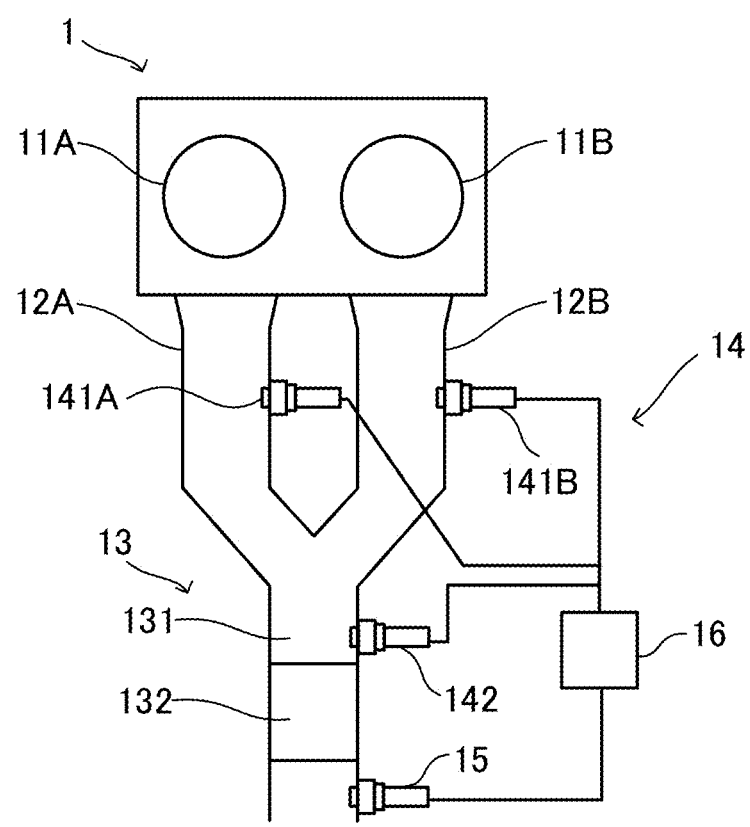
FIG. 10 schematically shows the entirety of a multi-cylinder engine unit according to third embodiment.

FIG. 10 schematically shows the entirety of a multi-cylinder engine unit according to third embodiment. A multi-cylinder engine unit 1 according to the third embodiment is different from the multi-cylinder engine unit according to the first embodiment in that all of the plurality of individual exhaust pipes 12A, 12B are provided with individual oxygen sensors 141A, 141B, and also that a pre-catalyst oxygen sensor 142 is disposed in a merge portion 131.

More specifically, the multi-cylinder engine unit 1 according to the third embodiment has a pre-catalyst oxygen sensor group 14 composed of the plurality of individual oxygen sensors 141A, 141B and the pre-catalyst oxygen sensor 142.

The plurality of individual oxygen sensors 141A, 141B are provided to the plurality of individual exhaust pipes 12A, 12B, respectively. The plurality of individual oxygen sensors 141A, 141B detect the percentages of oxygen in exhaust gases in the corresponding individual exhaust pipes 12A, 12B, respectively.

The pre-catalyst oxygen sensor 142 is disposed at a location in an exhaust manifold 13, the location being upstream of a catalyst 132 in a flow direction of the exhaust gas. The pre-catalyst oxygen sensor 142 detects the percentage of oxygen in the exhaust gas flowing into the catalyst 132.

How to detect a cylinder-to-cylinder imbalance in air-fuel ratio between the plurality of cylinders 11A, 11B in the third embodiment may be the same as in the first embodiment, or may be the same as in the second embodiment. To be specific, the control device 16 may detect a cylinder-to-cylinder imbalance in air-fuel ratio between the plurality of cylinders 11A, 11B by using detection results obtained by each of the plurality of individual oxygen sensors 141A, 141B, or may detect a cylinder-to-cylinder imbalance in air-fuel ratio between the plurality of cylinders 11A, 11B by using detection results obtained by a part of the individual oxygen sensors and the pre-catalyst oxygen sensor 142. In sum, the control device 16 detects a cylinder-to-cylinder imbalance in air-fuel ratio between the plurality of cylinders by using detection results obtained by the pre-catalyst oxygen sensor group 14.

The same is true for a detection of a deterioration of the catalyst 132. How to detect a deterioration of the catalyst 132 in the third embodiment may be the same as in the first embodiment, or may be the same as in the second embodiment. To be specific, a deterioration of the catalyst 132 may be detected by using the plurality of individual oxygen sensors 141A, 141B and the post-catalyst oxygen sensor 15; a deterioration of the catalyst 132 may be detected by using the pre-catalyst oxygen sensor 142 and the post-catalyst oxygen sensor 15; or a deterioration of the catalyst 132 may be detected by using the plurality of individual oxygen sensors 141A, 141B, the pre-catalyst oxygen sensor 142, and the post-catalyst oxygen sensor 15. In sum, the whole or a part of the plurality of individual oxygen sensors 141A, 141B and the pre-catalyst oxygen sensor 142 detects the percentage of oxygen in the exhaust gas upstream of the catalyst 132, and the post-catalyst oxygen sensor 15 detects the percentage of oxygen in the exhaust gas downstream of the catalyst 132, so that the control device 16 is able to detect a deterioration of the catalyst 132.

The embodiments and variations, of which at least either one of description or illustration has been given herein, are for ease of understanding the present disclosure, and not for limiting the concept of the present disclosure. The foregoing embodiments and variations may be altered and/or adapted without departing from the spirit of the present disclosure. The spirit encompasses equivalent elements, modifications, omissions, combinations (for example, a combination of features of any embodiment and any variation), adaptations and/or alterations as would be appreciated by those skilled in the art based on the embodiments disclosed herein. The limitations in Claims are to be broadly interpreted based on the language employed in Claims and not limited to embodiments and variations described herein or during the prosecution of the present application. The embodiments and variations are to be construed as non-exclusive. For example, in this Description, the terms "preferably," "may," and "possible," are non-exclusive and mean "preferably, but not limited to," "may, but not limited to," and "possibly, but not limited to," respectively.

REFERENCE SIGNS LIST

1: multi-cylinder engine unit
11A, 11B: cylinder
111: piston
112: combustion chamber
12A, 12B: individual exhaust pipe
13: exhaust manifold
131: merge portion
132: catalyst
14: pre-catalyst oxygen sensor group
141A, 141B: individual oxygen sensor
142: pre-catalyst oxygen sensor
15: post-catalyst oxygen sensor
16: control device

The invention claimed is:

1. A multi-cylinder engine unit of an individual-throttle type or an unequal-interval-combustion type, comprising:
a plurality of cylinders respectively cooperating with a plurality of pistons to define a plurality of combustion chambers;
a plurality of individual exhaust pipes corresponding to the plurality of cylinders, and being configured to allow exhaust gases from the plurality of cylinders to respectively flow therethrough;
an exhaust manifold, including:
a merge portion into which the plurality of individual exhaust pipes merge, and
a catalyst disposed downstream of the merge portion in a flow direction of the exhaust gas;
a pre-catalyst oxygen sensor group for detecting a first percentage of oxygen in the exhaust gas, the pre-catalyst oxygen sensor group being disposed between the plurality of cylinders and the catalyst for all paths of the exhaust gases flowing into the catalyst from the plurality of cylinders;
a post-catalyst oxygen sensor for detecting a second percentage of oxygen, the post-catalyst oxygen sensor being disposed in the exhaust manifold, and downstream of the catalyst in the flow direction of the exhaust gas; and
a control device configured to
detect a cylinder-to-cylinder imbalance in air-fuel ratio between the plurality of cylinders using a detection result obtained by the pre-catalyst oxygen sensor group, and
detect a deterioration of the catalyst using at least a partial detection result obtained by the pre-catalyst oxygen sensor group and a detection result obtained by the post-catalyst oxygen sensor,
without using an air-fuel ratio sensor, wherein
the pre-catalyst oxygen sensor group includes a plurality of oxygen sensors that is equal in number to the plurality of individual exhaust pipes, each oxygen sensor detecting the first percentage of oxygen in the exhaust gas flowing in a different one of the plurality of individual exhaust pipes.

2. The multi-cylinder engine unit according to claim 1, wherein
the pre-catalyst oxygen sensor group further includes a pre-catalyst oxygen sensor disposed in the exhaust manifold and upstream of the catalyst in the flow direction of the exhaust gas, for detecting a third percentage of oxygen in the exhaust gas flowing into the catalyst.

3. The multi-cylinder engine unit according to claim 1, further comprising:
a plurality of injectors provided corresponding to the plurality of cylinders, and being configured to supply fuel respectively to the plurality of cylinder based on an injector signal that is received from the control device, wherein
the control device is configured to, in at least a part of a catalyst deterioration diagnosis period for detecting the deterioration of the catalyst,
transmit the injector signal with a diagnosis-purpose fuel supply pattern to the plurality of cylinders so as to make an air-fuel ratio at the merge portion repeatedly alternate between being no lower than a first threshold and being no higher than a second threshold, and
adjust the diagnosis-purpose fuel supply pattern to maintain the repeated alternation of the air-fuel ratio at the merge portion.

4. The multi-cylinder engine unit according to claim 3, wherein
the control device executes a preparation control to cause the air-fuel ratio in the merge portion to alternate, and then executes a fuel increase/decrease control to maintain the repeated alternation, and
in the fuel increase/decrease control, the control device is configured to, in response to a difference between the air-fuel ratio in at least one of the plurality of cylinders and a diagnosis-purpose air-fuel ratio pattern being larger than a third threshold, adjust a part of the diagnosis-purpose fuel supply pattern corresponding to the at least one of the plurality of cylinders to maintain the repeated alternation at the merge portion.

5. The multi-cylinder engine unit according to claim 1, wherein
a full length of each of the plurality of individual exhaust pipes is longer than ¼ of a full length of the exhaust manifold.

6. The multi-cylinder engine unit according to claim 1, wherein
the multi-cylinder engine unit is configured to be installed in a vehicle including at least one front wheel and at least one rear wheel, in such a way that at least one of the plurality of individual exhaust pipes thereof at least partially overlaps the front wheel or the rear wheel in a front view of the vehicle.

7. The multi-cylinder engine unit according to claim 1, wherein the pre-catalyst oxygen sensor group consists of the plurality of oxygen sensors.

8. The multi-cylinder engine unit according to claim 1, wherein the control device is configured to detect both the deterioration of the catalyst and the cylinder-to-cylinder imbalance in air-fuel ratio between the plurality of cylinders using a detection result obtained by at least a same one of the plurality of oxygen sensors of the pre-catalyst oxygen sensor group.

* * * * *